United States Patent
Duvall et al.

(10) Patent No.: US 6,537,466 B1
(45) Date of Patent: Mar. 25, 2003

(54) LATENT MERCAPTANS AS MULTI-FUNCTIONAL ADDITIVES FOR HALOGEN-CONTAINING POLYMER COMPOSITIONS

(75) Inventors: Tod C. Duvall, West Chester; Paul B. Adams, Indiana Springs; Gene K. Norris, Cincinnati, all of OH (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/368,600

(22) Filed: Aug. 4, 1999

Related U.S. Application Data

(60) Division of application No. 09/008,542, filed on Jan. 16, 1998, which is a continuation-in-part of application No. 08/597,093, filed on Feb. 23, 1996, now abandoned, which is a continuation-in-part of application No. 08/435,413, filed on May 10, 1995, now abandoned.

(51) Int. Cl.$^7$ .............................. C08K 5/15; C08K 5/36; C09K 15/32; C09K 15/26
(52) U.S. Cl. .............................. 252/400.1; 252/400.62; 252/400.54; 252/402; 252/406; 524/110; 524/392
(58) Field of Search .................. 524/110, 392; 252/400.1, 400.62, 400.54, 402, 406

(56) References Cited

U.S. PATENT DOCUMENTS

| | | | | |
|---|---|---|---|---|
| 3,660,331 A | * | 5/1972 | Ludwig ..................... | 524/110 |
| 4,665,114 A | * | 5/1987 | Kugele et al. .............. | 524/181 |
| 4,912,159 A | * | 3/1990 | Hildebrand et al. ........ | 524/289 |
| 4,973,619 A | * | 11/1990 | Kemper ..................... | 524/285 |
| 5,166,241 A | * | 11/1992 | Kornbaum .................. | 524/175 |

* cited by examiner

*Primary Examiner*—Peter D. Mulcahy

(57) ABSTRACT

Halogen-containing polymer compositions comprising a latent mercaptan-containing heat stabilizer composition substantially free from the offensive odor typically associated with mercaptans are protected during processing by the degradation products of the latent (i.e., blocked) mercaptan which include a free mercaptan. Other products of the degradation are believed to include carbocations of the blocking moiety which are stabilized by a molecular structure in which the electron deficiency is shared by several groups. The latent mercaptan may be the sole heat stabilizer additive but the free mercaptan released during processing may also synergize the activity of metal-based heat stabilizers such as metal salts and organometallic stabilizers such as organotin carboxylates and mercaptides in the polymer composition. The odor of primary mercaptan-containing heat stabilizers in halogenated polymer compositions is masked by a small amount of a latent mercaptan. The latent mercaptans also serve as intermediates in the preparation of anti-oxidants, anti-microbial agents, photostabilizers, and primary heat stabilizers. Highly effective heat stabilizers are prepared by the condensation of formaldehyde and a para-phenol and further condensation of the crude product with a mercapto-containing compound.

8 Claims, No Drawings

LATENT MERCAPTANS AS MULTI-FUNCTIONAL ADDITIVES FOR HALOGEN-CONTAINING POLYMER COMPOSITIONS

This is a divisional of co-pending application Ser. No. 09/008,542 filed on Jan. 16, 1998; which was a C-I-P of Ser. No. 08/597,093 filed Feb. 23, 1996, now abandoned; which was a C-I-P of Ser. No. 08/435,413 filed May 10, 1995, now abandoned.

FIELD OF THE INVENTION

This invention relates to stabilizer compositions comprising degradation products of a blocked mercaptan present during processing of the composition at an elevated temperature, said products including a free mercaptan. This invention also relates to polymer compositions containing a polymer normally susceptible to heat-induced deterioration and the degradation products of a blocked mercaptan present during processing of the composition at an elevated temperature, said products including a free mercaptan. It also relates to such polymer compositions further containing a metallic-based heat stabilizer. This invention also relates to articles of manufacture, e.g. pipe, film, and window profile, made from stabilized polymer compositions containing a polymer normally susceptible to heat-induced deterioration, the degradation products of a blocked mercaptan present during processing of the composition at an elevated temperature, said—based heat stabilizer. Another aspect of this invention is the development of a novel reaction scheme which, although crude, affords latent mercaptans which need no purification to be highly active PVC heat stabilizers at low use levels.

This invention also relates to latent mercaptans which are substantially free of the offensive odor typical of mercaptans and which may be used as anti-oxidants, odorants, anti-microbial agents, chelating agents and photostabilizers; and as intermediates for the preparation of anti-oxidants and primary heat stabilizers. It also relates to such anti-oxidants and primary heat stabilizers.

BACKGROUND OF THE INVENTION

It is well known that the physical properties of various organic polymers deteriorate and color changes take place during processing of the polymer and during exposure of formed polymer products to certain environments. The prime examples of polymers which are susceptible to degradation during processing are the halogen-containing polymers such as the vinyl and vinylidene polymers in which the halogen is attached directly to carbon atoms. Poly (vinyl chloride) or PVC, copolymers of vinyl chloride and vinyl acetate, and poly (vinylidene chloride), the principal resin in self-clinging transparent food wraps, are the most familiar polymers which require stabilization for their survival during fabrication into pipes, window casings, siding, bottles, and packaging film, etc. When such polymers are processed at elevated temperatures, undesirable color changes often occur within the first 5 to 10 minutes as well as during later stages of the processing. Haziness, which sometimes accompanies the color changes, is particularly undesirable where clear products are needed. The addition of heat stabilizers to such polymers has been absolutely essential to the widespread utility of the polymers. From a great deal of work in the development of more and more effective heat stabilizers there has emerged two principal classes: organotin compounds and mixed metal combinations. Organotin-based heat stabilizers are the most efficient and widely used PVC stabilizers. Synergistic combinations of alkyltin mercaptides and free mercaptans are particularly efficient heat stabilizers for PVC during extrusion. They have not been entirely satisfactory, however, because of several failings on the part of the mercaptan synergist. Many mercaptans give off an offensive odor even at room temperature and the odor grows worse at PVC, processing temperatures. The oxidative stability of the mercaptans is very often very poor. Oxidation of the free mercaptans diminishes the synergism. Thus, a combination having an enhanced synergism would be welcomed by the PVC industry. Also, because of the end-use of articles made from some polymers, many polymeric compositions require the presence of both biocides and heat stabilizers but the use of the organotin mercaptide/mercaptan combination in such a composition is often frustrated by the tendency of the free mercaptan to deactivate a biocide such as the much used OBPA (10, 10'-oxybisphenoxarsine).

In U.S. Pat. No. 3,660,331, Ludwig teaches the stabilization of vinyl halide resins by certain thioethers and thioesters of tetrahydropyran. Better heat stabilizer compositions are still needed, however. The thioethers of this invention satisfy that need.

SUMMARY OF THE INVENTION

It is an object of this invention, therefore, to provide a heat stabilizer composition having the synergy of a mercaptan plus improved oxidative stability.

It is another object of this invention to provide a latent mercaptan-containing heat stabilizer composition which is substantially free from the offensive odor typically associated with mercaptans.

It is a related object of this invention to provide a latent mercaptan-containing heat stabilizer composition which has a decidedly pleasant odor.

It is a further object of this invention to provide an improved polymeric composition containing a biocide and a latent mercaptan-containing heat stabilizer.

It is a related object of this invention to provide a polymeric composition containing a heat stabilizer combination having the synergy of a mercaptan plus improved oxidative stability.

It is still another object of this invention to provide latent mercaptans as intermediates for the preparation of anti-oxidants, anti-microbial agents, photostabilizers, and primary heat stabilizers.

These and other objects of the invention which will become apparent from the following description are achieved by incorporating into a polymeric composition containing a polymer normally susceptible to heat-induced deterioration a blocked mercaptan which degrades during processing of the composition at an elevated temperature to liberate a free mercaptan. The latent mercaptan may act as the sole heat stabilizer but the free mercaptan may also synergize the activity of other heat stabilizers in the composition. Other products of the degradation of the blocked mercaptan are believed to include carbocations of the blocking moiety which are stabilized by a molecular structure in which the electron deficiency is shared by several groups. Resonance stabilization and neighboring group stabilization are two of the possible mechanisms by which the carbocations may be stabilized. The carbocations act as intermediates in the formation of stable compounds early in the hot processing of halogen-containing polymers. Although such mechanisms and the resultant carbocations are believed to be an impetus for the liberation of the active free mercaptan, this invention is in no way limited by the foregoing attempt to explain the working of the invention. Those skilled in the art will see the resonance stabilization and neighboring group stabilization that are possible in the following structures of the blocked mercaptan; other mechanisms may be at work in other blocked mercaptans represented by these structures that also liberate an active free mercaptan upon thermal and/or chemical degradation during processing of polymeric compositions containing such blocked mercaptans. For the purposes of this invention, the terms "blocked mercaptan" and "latent mercaptan" are used interchangeably to mean a thioether which degrades during processing of the composition at an elevated temperature to liberate a free mercaptan.

The stabilizer compositions of the present invention may comprise a metal-based stabilizer and such a latent mercaptan or mixture of latent mercaptans.

DETAILED DESCRIPTION OF THE INVENTION

As used herein: the terms "group" and "radical" are used interchangeably, a mono-valent radical has but one valence available for combining with another radical whereas a di-valent radical may combine with two other radicals; the term alkyl represents monovalent straight or branched chain hydrocarbon radicals containing, for example, 1 to 20 carbon atoms; the term alkylenyl represents divalent, trivalent, and tetravalent straight or branched chain hydrocarbon radicals containing, for example, 1 to 20 carbon atoms; the term aryl represents monovalent $C_6$–$C_{10}$ aromatic rings such as benzene and naphthalene; the term alkenyl represents monovalent straight or branched chain $C_2$ to $C_{20}$ hydrocarbon radicals containing at least one double bond; the term aralkyl represents a monovalent $C_1$ to $C_{20}$ hydrocarbon radical having attached thereto an aryl radical; the term alkaryl represents monovalent aryl radicals having attached thereto at least one $C_1$–$C_{20}$ alkyl group; the term cycloalkyl represents monovalent $C_3$–$C_8$ saturated cycloaliphatic radicals; the term cycloalkenyl represents $C_5$–$C_8$ cycloaliphatic radicals containing at least one double bond; the term polyalkoxy means a chain of from 2 to 6 alkoxy groups wherein the alkoxy group is ethoxy, propoxy, isopropoxy, butoxy, or the like, with or without an end group such as hydroxy, acyloxy, benzyloxy, benzoyloxy, butoxy, and tetrahydropyranyloxy; the term halogen-containing organic polymers represents halogen-containing vinyl and vinylidenepolymers or resins in which the halogen is attached directly to the carbon atoms.

Also, as used herein: an acyloxyalkyl radical originates from a carboxylic acid ester of an alkyl alcohol; the $R^1$ radical in Formula 1 below, therefore, in the stearic acid ester of mercaptopropanol is the stearoyloxypropyl radical; likewise, the $R^1$ radical of the oleic acid ester of mercaptopropanol, which is one the tallate esters of that alcohol, is the oleoyloxypropyl radical; the $R^1$ radical of lauryl-3-mercaptopropionate, on the other hand, is dodecyloxy-carbonylpropyl.

The polymeric compositions of this invention contain polymers normally susceptible to heat-induced deterioration through autoxidation such as the above-noted halogen-containing polymers. The stabilizer compositions of this invention are particularly suited to impart a superior stabilization against the deteriorative effects of heat and ultraviolet light on halogen-containing organic polymers compared to that imparted by stabilizer compositions previously known in the art.

The halogen-containing organic polymers which can be stabilized according to this invention include chlorinated polyethylene having 14 to 75%, e.g. 27%, chlorine by weight, chlorinated natural and synthetic rubber, rubber hydrochloride, chlorinated polystyrene, chlorinated polyvinyl chloride, polyvinyl bromide, polyvinyl fluoride, copolymers of vinyl chloride with 1 to 90%, preferably 1 to 30%, of a copolymerizable ethylenically unsaturated material such as, for example, vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride ((86:13:1), vinyl chloride-vinylidene chloride (95:5); vinyl chloride-diethyl fumarate (95:5), and vinyl chloride 2-ethylhexyl acrylate (80:20). In addition to the stabilizer compositions of this invention, there can also be incorporated into the halogen-containing organic polymer conventional additives such as plasticizers, pigments, fillers, dyes, ultraviolet light absorbing agents, densifying agents, biocides and the like.

Preferably, the halogen-containing organic polymer is a vinyl halide polymer, more particularly. a vinyl chloride polymer. Usually, the vinyl chloride polymer is made from monomers consisting of vinyl chloride alone or a mixture of monomers comprising, preferably, at least about 70% by weight based on the total monomer weight of vinyl chloride.

FORMULA 1 is representative of the blocked mercaptans that are suitable for the purposes of this invention:

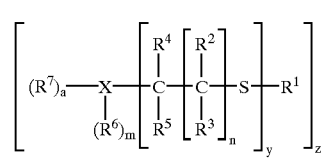

FORMULA 1 wherein a is 0 or 1, m and n are 0 or 1; y=1 to 4; when y=1, z is 1 to 4; and when y is more than 1, z is 1; R1 is an alkyl, alkylenyl, cycloalkyl, cycloalkylenyl, aryl, alkaryl, aralkyl, aralkylenyl, hydroxyalkyl, dihydroxyalkyl, hydroxy (polyalkoxy)alkyl, alkoxyalkyl, hydroxyalkoxyalkyl, alkoxy(hydroxyalkyl), alkoxy(acyloxyalkyl), alkoxy (polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy(polyalkoxy)alkyl, benzoyloxy (polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy) carbonylalkyl, mercaptoalkyl, mercaptoalkylenyl, mercaptoalkoxycarbonylalkyl, mercaptoalkoxycarbonylalkylenyl, alkoxycarbonyl(amido) alkyl, alkylcarbonyloxy(polyalkoxy)carbonylalkyl, tetrahydopyranyloxy(polyalkoxy)carbonylalkyl, tetrahydropyranyloxyalkyl, hydroxyaryl, mercaptoaryl or carboxyaryl radical having from 1 to 22 carbon atoms; $R^2$, $R^3$, $R^4$, $R^5$, $R^6$, and $R^7$ are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, mercaptoaryl groups having from 1 to 22 carbon atoms; X is aryl, haloaryl, alkaryl, hydroxyaryl, dihydroxyaryl, alkoxyaryl, arylcycloalkyl, or a heteroatom, with the option that when a is 1 and m is 1, $R^6$ and $R^7$ form a heterocyclic moiety in conjunction with X as nitrogen, and with the further option that when a=1 and m=0, one of $R^1$, $R^3$, and $R^5$ joins with $R^7$ and X to form a heterocyclic moiety with X as a heteroatom selected from the group consisting of oxygen and sulfur; with the proviso that z is 1 or 2 when X is aralkaryl, $R^6$ and $R^7$ are hydroxyl, a is 1 and m is 1, and with the further proviso that when $R^6 \neq$ hydroxyl or mercapto, z is 1.

A polymeric composition wherein the blocked mercaptan has the following structure is another embodiment of this invention:

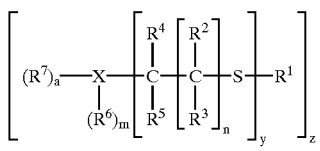

FORMULA 1 wherein a is 0 or 1; m and n are 0 or 1; y=1 to 4, when y=1, z is 1 to 4 when y is more than 1 z is 1; R1 is an an alkyl, alkylenyl, cycloalkyl, cycloalkylenyl, aryl, alkaryl, aralkyl, aralkylenyl, hydroxyalkyl, dihydroxyalkyl, hydroxy (polyalkoxy) alkyl, alkoxy (polyalkoxy) carbonylalkyl, alkoxyalkyl, hydroxyalkoxyalkyl, alkoxy(hydroxyalkyl), alkoxy(acyloxyalkyl), alkoxy(polyalkoxy) alkyl, carboxyalkyl, acyloxyalkyl, acyloxy (hydroxyalkyl), acyloxyalkoxyalkyl, acyloxy(polyalkoxy)alkyl, benzoyloxy (polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy) carbonylalkyl, mercaptoalkyl, mercaptoalkylenyl, mercaptoalkoxycarbonylalkyl, mercaptoalkoxycarbonylalkylenyl, alkoxycarbonyl (amido) alkyl, alkylcarbonyloxy(polyalkoxy)carbonylalkyl, tetrahydopyranyloxy(polyalkoxy)carbonylalkyl, tetrahydropyranyloxyalkyl, hydroxyaryl, mercaptoaryl or carboxyaryl radical having from 1 to 22 carbon atoms; $R^2$, $R^3$, $R^4$, $R^5$, $R^6$, and $R^7$ are independently hydrogen, a hydroxyl, mercapto, alkyl, alkylenyl, aryl, haloaryl, alkaryl, aralkyl, hydroxyalkyl, mercaptoalkyl, hydroxyalkylmercaptoalkyl, mercaptoalkylenyl, hydroxyaryl, alkoxyaryl, alkoxyhydroxyaryl, arylcarbonyl, or mercaptoaryl radical having from 1 to 22 carbon atoms; when a=1, X is arylcycloalkyl or a heteroatom, and when a=0, X is aryl, haloaryl, alkaryl, alkoxyaryl, arylcycloalkyl, or a heteroatom, with the option that when a is 1 and m is 0, one of R3 and $R^5$ joins with $R^7$ and X to form a heterocyclic moiety with X as a heteroatom selected from the group consisting of oxygen and sulfur, and with the further option that when a is 1 and m is 1, $R^6$ and $R^7$ form a heterocyclic moiety in conjunction with X as a nitrogen atom.

The mercaptan-containing organic compounds which may be converted into latent mercaptans for the purposes of this invention are well-known compounds and include alkyl mercaptans, mercapto esters, mercapto alcohols, and mercapto acids. See, for example, U.S. Pat. Nos. 3,503,924 and 3,507,827. Alkyl mercaptans having from 1 to about 200 carbon atoms and from 1 to 4 mercapto groups are suitable.

Mercaptan-containing organic compounds which include $R^1$ have structures illustrated by the following formulas:

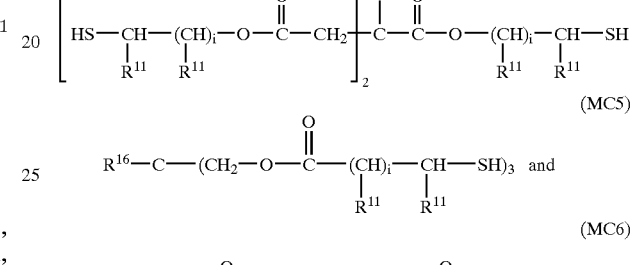

wherein $R^{10}$ and $R^{19}$ are the same or different and are $$O-\overset{O}{\underset{\|}{C}}-R^{17}, \quad -\overset{O}{\underset{\|}{C}}-O-R^{17}, \quad -OH, \quad -SH,$$
aryl, $C_1$ to $C_{18}$ alkyl, or $-H$;

$R^{11}$ is $-H$ aryl, or $C_1$ to $C_{18}$ alkyl;
$R^{12}$ is cycloalkyl, cycloalkenyl or phenyl;
$R^{13}$ is $$O-\overset{O}{\underset{\|}{C}}-R^{17}, \quad -\overset{O}{\underset{\|}{C}}-O-R^{17}, \quad -SH, \quad \text{aryl},$$
$C_1$ to $C_{18}$ alkyl, $-OH$ or $-H$ with the proviso that in formula (MC2) when $R^{12}$ is phenyl, $R^{13}$ is $-OH$ and i=0, then the $-SH$ groups are on non-adjacent carbon atoms;
$R^{14}$ is $-H$ or a divalent group which may contain halogen, hydroxy, mercapto or alkyl substituents and which when $R^{12}$ is phenyl combines with the phenyl to form a naphthalene ring;
$R^{15}$ is $$-O-\overset{O}{\underset{\|}{C}}-R^{18}-\overset{O}{\underset{\|}{C}}-O-,$$

$$-O-\overset{O}{\underset{\|}{C}}-CH=CH-\overset{O}{\underset{\|}{C}}-O-, \text{ or}$$

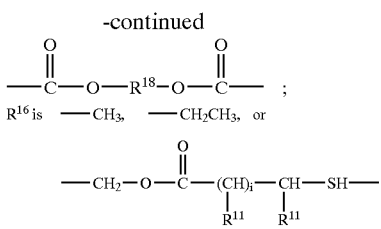

$R^{16}$ is —$CH_3$, —$CH_2CH_3$, or

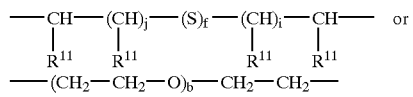

$R^{17}$ is —H, or alkyl, alkenyl, aryl, aralkyl, alkaryl, cycloalkyl, cycloalkylenyl;

$R^{18}$ is arylene, $C_1$ to $C_8$ alkylenyl,

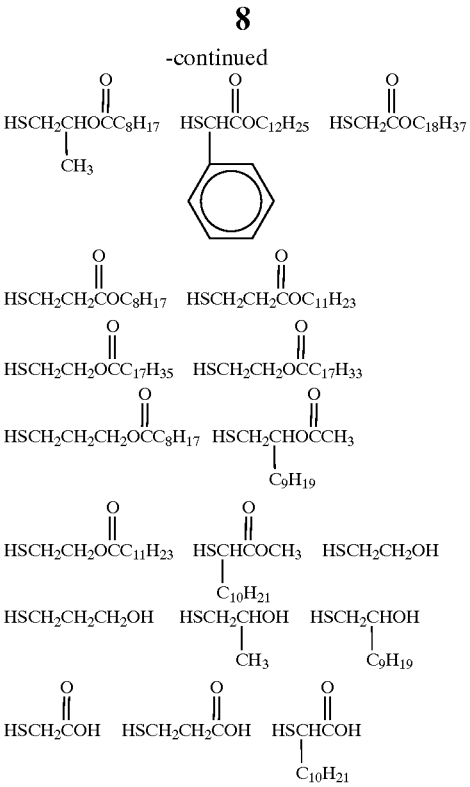

wherein b is an integer from 1 to 6;
i=0 or an integer from 1 to 6 inclusive;
j=0, 1, 2 or 3; and
f=1 or 2.

Mercaptan-containing organic compounds preferred as intermediates in the preparation of the latent mercaptans of this invention are those compounds according to formula (MC1) where $R^{11}$ is —H, $R^{19}$ is —H, $R^{10}$ is OH or

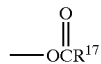

and i=1; those compounds according to formula (MC2) where $R^{12}$ is phenyl, $R^{11}$ is —H, $R^{13}$ is —H, $R^{14}$ is —H, i=1, and j=1; those compounds according to formula (MC3) where $R^{11}$ is —H, $R^{15}$ is

and i=1; those compounds according to formula (MC4) where $R^{11}$ is —H and i=1; those compounds according to formula (MC5) where $R^{16}$ is —$C_2H_5$ or

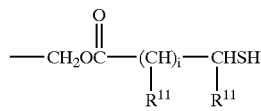

$R^{11}$ is —H and i=1; and those compounds according to formula (MC6) where $R^{11}$ is —H and i=1.

Examples of the mercaptan-containing organic compounds described by formula (MC1) include, but are not limited to, the following compounds:

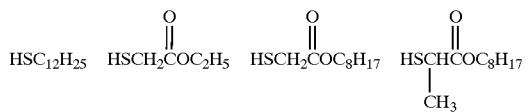

Examples of the mercaptan-containing organic compounds described by formula (MC2) include, but are not limited to, the following compounds:

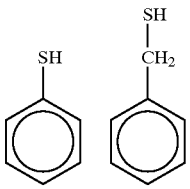

Examples of mercaptan-containing organic compounds represented by formula (MC3) include, but are not limited to the following compounds:

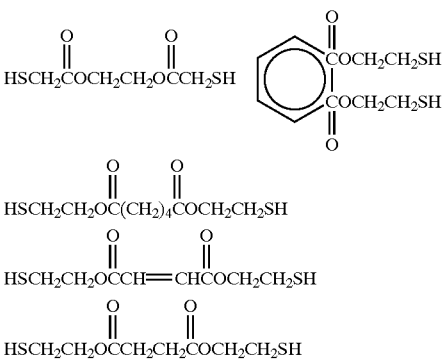

The mercaptan-containing organic compounds described by formula (MC4) are exemplified by, but are not limited to, the following:

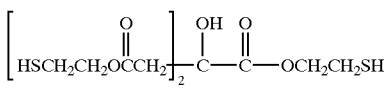

The mercaptan-containing organic compounds represented by formula (MC5) are exemplified by, but are not limited to, the following:

The mercaptan-containing organic compounds represented by formula (MC6) are exemplified by, but are not limited to, the following:

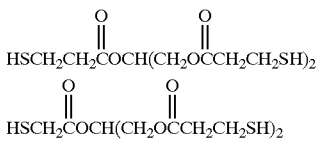

One of the advantages of this invention is that the offensive odor of the mercaptans is masked by the blocking group so that the latent mercaptan thus created may be put into a PVC composition or the like with little or no offense to the operator with the knowl-edge that the free mercaptan will be released as a degradation product when the treated composition is heated during the usual processing, e.g. extrusion. This advantage is also useful for the liquid polysulfides having a molecular weight of from about 1000 to about 8000 sold under the LP trademark by Morton International, Inc.

The blocking compounds are preferably those which are capable of furnishing a stabilized carbocation having a molecular structure in which the electron deficiency is shared by several groups. Resonance stabilization and neighboring group stabilization are two of the possible mechanisms by which the carbocations may be stabilized. Polarized, unsaturated compounds exemplified by 3,4-dihydropyran, 2-methoxy-3,4-dihydropyran, styrene, α-methylstyrene, vinyl benzyl chloride, indene, 2-vinylpyridine, N-vinylpyrrolidone, vinyl acetate, octadecyl vinyl ether, cyclohexyl divinyl ether, ethyleneglycol monovinyl ether, allyl phenyl ether, trans-cinnamaldehyde, N-methyl-N-vinylacetamide, N-vinylcaprolactam, isoeugenol, and 2-propenylphenol are suitable. Compounds having labile halogen atoms which split off as hydrogen chloride in a condensation reaction with the mercaptan, as exemplified by triphenylmethyl chloride, benzyl chloride, and bis(chloromethyl) benzene, are also suitable. The mercaptan may also be blocked by condensation with an aldehyde such as butyraldehyde or with a benzyl alcohol such as benzene dimethanol. A preferred blocking agent is 2-hydroxybenzyl alcohol, a well known intermediate in the perfume, agricultural, and plastics industries.

In general, the procedure for adding the mercapto group of a free mercaptan across the double bonds of polarized, unsaturated compounds is:

To a stirred mixture of the mercaptan, acid catalyst, and optionally, a small percentage of antioxidant to inhibit radical reactions, under nitrogen atmosphere is added dropwise the polarized, unsaturated compound, either neat or in solution, while maintaining the temperature between 10°–70° C. The mixture or solution is then heated for between 1 to 6 hours at 35°–70° C. and conversion to product is monitored by gas chromatography and iodine titration for SH. The acid catalyst is removed by an alkaline wash and the resulting product is dried with magnesium sulfate and filtered. The solvent, if required, is removed under reduced pressure at <50° C. to yield the latent mercaptan. This generalized procedure is referred to hereinafter as Procedure A.

In accordance with Procedure A, for example, mercaptoethanol is added across the double bond of N-vinylcaprolactam to yield N-2-hydroxyethylthioethylcaprolactam. Mercaptoethyldecanoate (or mercaptoethylcaproate) reacts with 3,4-dihydropyran in that procedure to give 2-S-(tetrahydropyranyl)thioethyldecanoate. Bis (hydroxyethylthioethyl) cyclohexyl ether is made from the mercaptoethanol and cyclohexyl di-vinyl ether. In like manner, the corresponding caprate, oleate, and tallate esters form the corresponding cyclohexyl ethers. Also, indene is converted by the addition of the mercaptoethanol to 2H-dihydroindenylthio-ethanol.

A generalized procedure for the condensation of a free mercaptan with a labile halogen-containing compound is as follows:

To a stirred mixture of the mercaptan and halogen-containing compound under nitrogen atmosphere is added dropwise a solution of sodium methoxide in methanol while maintaining the temperature below 50° C. Optionally, the reaction is allowed to proceed without the addition of a base source and the liberated hydrogen chloride is removed by nitrogen gas sweep and neutralized with the use of an external acid scrubber. The mixture or solution is then heated for between 2 to 24 hours at 50°–70° C. and conversion to product is monitored by gas chromatography and iodine titration for % SH. The product is then neutralized, washed with water, dried with magnesium sulfate, and filtered. The solvent, if required, is removed under reduced pressure at <50° C. to yield the latent mercaptan. This generalized procedure is referred to hereinafter as Procedure B.

A generalized procedure for the condensation of a free mercaptan with a labile hydroxyl-containing compound is as follows:

To a stirred solution of the mercaptan, acid catalyst, and solvent under nitrogen atmosphere is added the hydroxy-containing compound either neat or in solution while maintaining the temperature <45° C. The solution is then heated to 45°–75° C. for between 1 to 10 hours and conversion to product is monitored by gas chromatography and iodine titration for % SH. Optionally, an azeotropic solvent is chosen for removal of reaction water by an appropriate means at reflux temperatures, typically 60°–120° C. Completion of reaction is achieved after the theory amount of water has been collected. The acid catalyst is removed by alkaline wash and the resulting solution is dried with magnesium sulfate and filtered. The solvent is removed under reduced pressure at <55° C. to yield the latent mercaptan. This procedure is referred to hereinafter as Procedure C.

For example, 2-hydroxybenzyl alcohol condenses with mercaptoethanol in accordance with Procedure C to form 1-(2-hydroxyphenyl)-1-S-(2-hydroxyethylthio)methane.

A generalized procedure for the reaction of a free mercaptan with a glycidyl ether is as follows:

To a stirred mixture of the mercaptan and acid catalyst under nitrogen atmosphere is added the glycidyl ether, either neat or in solution, while maintaining the temperature between 25°–60° C. The mixture or solution is then heated to between 50°–75° C. for a period of 1 to 6 hours and conversion to product is monitored by gas chromatography and iodine titration for % SH. The acid catalyst is removed by alkaline wash, the resulting product is dried with magnesium sulfate, and filtered. The solvent, if required, is removed under reduced pressure at <55° C. to yield the latent mercaptan. For example, the reaction between mercaptoethanol and glycidyl neodecanoate gives $C_9H_{19}C(=O)OCH_2CH(OH)CH_2SCH_2CH_2OH$. This procedure is referred to hereinafter as Procedure D.

A generalized procedure for the condensation of a free mercaptan with an aldehyde is as follows:

To a stirred solution of the mercaptan, acid catalyst, and azeotropic solvent under nitrogen atmosphere is added the aldehyde with heating to reflux, typically between 65°–120° C., for removal of reaction water. Completion of reaction is achieved after the theory amount of water has been collected. Optionally, to a stirred solution of mercaptan, aldehyde, and ether is added $BF_3$-etherate dropwise under ref lux conditions. The solution is refluxed for between 1 to 6 hours and conversion to product is monitored by gas chromatography. The acid catalyst is removed by alkaline wash, the solution is dried with magnesium sulfate and filtered. The solvent is removed under reduced pressure at <65° C. to yield the latent mercaptan. This generalized procedure is referred to hereinafter as Procedure E.

Examples of the blocked mercaptans of this invention include compounds having the following formulas, as each relates to FORMULA 1:

FORMULA

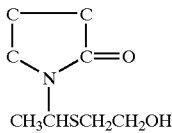

$CH_3CHSCH_2CH_2OH$ a=1, m=1, n=0; y=1, z is 1; X is nitrogen, $R^6$ and $R^7$ are joined to form —$CH_2$—$CH_2$—$CH_2$—C=(O)—; $R^4$ is hydrogen; $R^5$ is methyl; and $R^1$ is hydroxyethyl.

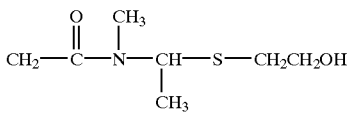

a=1, m=1, n=0; y=1, z is 1; X is nitrogen, $R^6$ is acetyl, $R^7$ is methyl, $R^5$ is methyl, $R^4$ is hydrogen, and $R^1$ is hydroxyethyl.

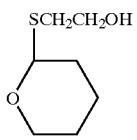

a=1, m=0, n=0; y=1, z is 1; X is oxygen, $R^5$ and $R^7$ are joined to form —$CH_2$—$CH_2$—$CH_2$—$CH_2$—; $R^4$ is hydrogen, and $R^1$ is hydroxyethyl.

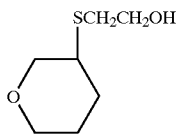

a=1, m=0, n=1, y=1, z=1; X is oxygen, $R^3$ and $R^7$ join to form —$CH_2$—$CH_2$—$CH_2$—; $R^2$, $R^4$ and $R^5$ are hydrogen, and $R^1$ is hydroxyethyl.

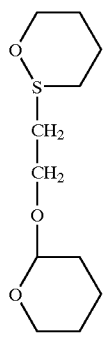

a=1, m=0, n=0, y=1, z=1; X is oxygen, $R^5$ and $R^7$ join to form —$CH_2$—$CH_2$—$CH_2$—$CH_2$—; $R^4$ is hydrogen, and $R^1$ is 2-ethoxytetrahydropyranyl.

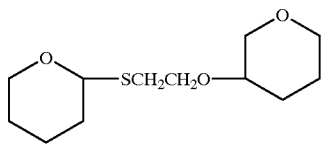

a=1, m=0, n=0, y=1, z=1; X is oxygen, $R^5$ and $R^7$ join to form —$CH_2$—$CH_2$—$CH_2$—$CH_2$—; $R^4$ is hydrogen, and $R^1$ is 3-ethoxytetrahydropyranyl.

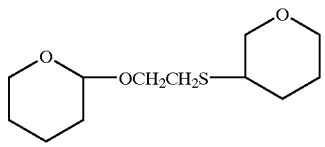

a=1, m=0, n=1, y=1, z=1; X is oxygen, $R^3$ and $R^7$ join to form —$CH_2$—$CH_2$—$CH_2$—; $R^2$, $R^4$ and $R^5$ are hydrogen, and $R^1$ is 2-ethoxytetrahydropyranyl.

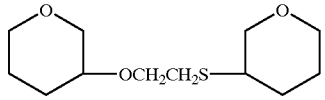

a=1, m=0, n=1, y=1, z=1; X is oxygen, $R^3$ and $R^7$ join to form —$CH_2$—$CH_2$—$C_2$—; $R^2$, $R^4$ and $R^5$ are hydrogen, and $R^1$ is 3-ethoxytetrahydropyranyl.

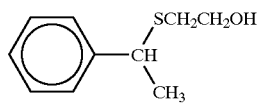

a=0, m=0, n=, y=1, z=1; X is phenyl, $R^4$ is methyl, $R^5$ is hydrogen, and $R^1$ is hydroxyethyl.

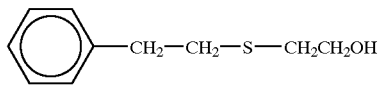

a=0, m=0, n=1, y=1, z=1, X is phenyl, $R^2$, $R^3$, $R^4$, and $R^5$ are hydrogen, and $R^1$ is hydroxyethyl.

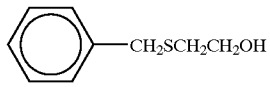

a=0, m=0, n=0, z=1; y=1, X is phenyl, $R^4$ and $R^5$ are hydrogen, and $R^1$ is hydroxyethyl.

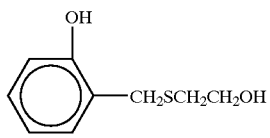

a=1, m=0, n=0, y=1, z=1; X is phenyl, $R^4$ and $R^5$ are hydrogen, $R^7$ is o-hydroxy, and $R^1$ is hydroxyethyl.

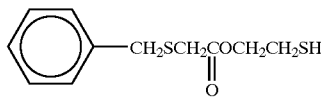

a=0, m=0, n=0, y=1, z=1; X is phenyl, $R^4$ and $R^5$ are hydrogen, and $R^1$ is mercaptoethoxycarbonylmethyl.

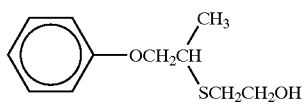

a=1, m=0, n=1, y=1, z=1; X is oxygen, $R^2$, $R^4$ and $R^5$ are hydrogen, $R^3$ is methyl, $R^7$ is phenyl, and $R^1$ is hydroxyethyl.

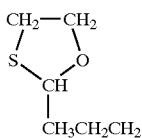

a=1, m=0, n=0, y=1, z=1; X is oxygen, $R^7$ and $R^1$ are joined to form an ethylenyl radical, $R^4$ is hydrogen, and $R^5$ is propyl.

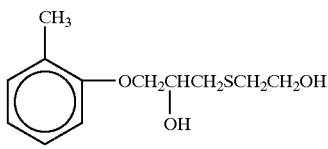

a=0, m=1, n=1, y=1, z=1; X is oxygen, $R^2$, $R^3$, $R^6$ and $R^4$ are hydrogen, $R^5$ is 2-methyleneoxytolyl, and $R^1$ is hydroxyethyl.

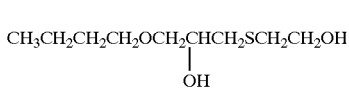

a=1, m=0, n=1, y=1, z=1; X is oxygen, $R^2$, $R^3$, $R^4$ and $R^7$ are hydrogen, $R^5$ is butoxymethyl, and $R^1$ is hydroxyethyl.

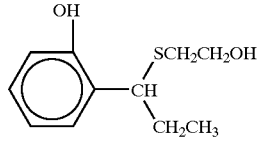

a=1, m=0, n=0, y=1, z=1; X is phenyl, $R^4$ is hydrogen, $R^5$ is ethyl, $R^7$ is o-hydroxy, and $R^1$ is hydroxyethyl.

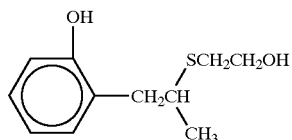

a=1, m=0, n=1, y=1, z=1; X is phenyl, $R^3$, $R^4$ and $R^5$ are hydrogen, $R^2$ is methyl, $R^7$ is o-hydroxy, and $R^1$ is hydroxyethyl.

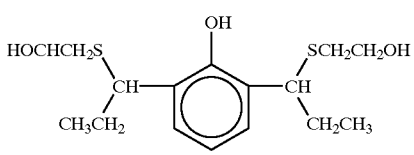

a=1, m=0, n=0, y=1, z=2; X is phenyl, $R^4$ is hydrogen, $R^5$ is ethyl, $R^7$ is o-hydroxy, and $R^1$ is hydroxyethyl.

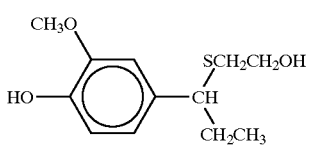

a=1, m=0, n=0, y=1, z=1; X is m-methoxyphenyl, $R^4$ is hydrogen, $R^5$ is ethyl, $R^7$ is p-hydroxy, and $R^1$ is hydroxyethyl.

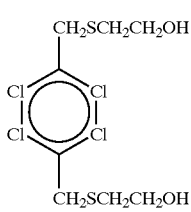

a=0, m=0, n=0, y=1, z=2; X is tetrachlorophenyl, $R^4$ and $R^5$ are hydrogen, and $R^1$ is hydroxyethyl.

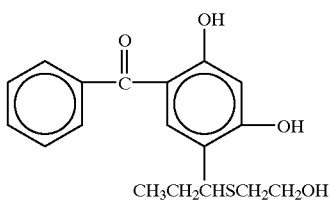

a=1, m=0, n=0, y=1, z=1; X is o,p-dihydroxyphenyl, $R^7$ is m-phenylcarbonyl, $R^4$ is hydrogen, $R^5$ is —$CH_2CH_3$, and $R^1$ is hydroxyethyl.

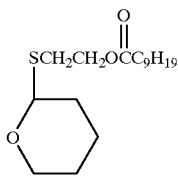

a=1, m=0, n=0; y=1, z is 1; X is oxygen, $R^5$ and $R^7$ are joined to form —$CH_2$—$CH_2$—$CH_2$—$CH_2$—; $R^4$ is hydrogen, and $R^1$ is decanoyloxyethyl.

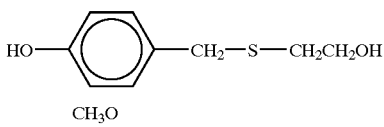

a=1, m=0 n=0; y=1, z is 1; X is p-hydroxyphenyl, $R^4$ and $R^5$ are hydrogen, $R^7$ is m-methoxy, and $R^1$ is hydroxyethyl.

As stated above, the stabilizer compositions of the present invention comprise a latent mercaptan as the sole heat stabilizer or in a system comprising a metal-based stabilizer, an organic-based stabilizer, or a hydrotalcite-based stabilizer in admixture with the latent mercaptan. Metal-based stabilizers are defined for the purposes of this invention as metal salt stabilizers and organometallic stabilizers. The metal salt stabilizers are exemplified by barium, strontium, calcium, cadmium, zinc, lead, tin, magnesium, cobalt, nickel, titanium, antimony, and aluminum salts of phenols, aromatic carboxylic acids, fatty acids, epoxidized fatty acids, oxalic acid, carbonic acid, sulfuric acid, and phosphoric acid. Calcium stearate, calcium 2-ethyl-hexeate, calcium octoate, calcium oleate, calcium ricin-oleate, calcium myristate, calcium palmitate, calcium laurate, barium laurate, barium stearate, barium di(nonylphenolate), magnesium stearate, zinc stearate, zinc octoate, cadmium laurate, cadmium octoate, cadmium stearate, sodium stearate and other Group I and II metal soaps are examples of suitable salts. Other metal salts such as lead stearate, hydrotalcite, aluminum stearate, etc, can be used. Metal salt stabilizers may constitute from about 0.1 to about 10%, preferably 0.1–5% by weight of the halogen containing resin.

Conventional organometallic stabilizers include the organotin carboxylates and mercaptides. Such materials include butyltin tris dodecyl mercaptide, dibutyltin dilaurate, dibutyltin didodecyl mercaptide, dianhydride tris dibutylstannane diol, dihydrocarbontin salts of carboxy mercaptals such as those set forth in Hechenbleikner et al. (U.S. Pat. No. 3,078,290). There can be included any of the vinyl chloride resin stabilizers set forth in Salyer (U.S. Pat. No. 2,985,617).

As an example of a system involving an organic-based stabilizer, a combination of a latent mercaptan and an N-substituted maleimide has been found to be synergistic in the stabilization of a flexible PVC formulation.

The stabilizer compositions of this invention comprise from about 10% to about 100%, preferably from about 35% to about 85%, by weight of one or more latent mercaptans, based on the total weight of the stabilizer composition, the balance comprising the metal-based, organic-based, or hydrotalcite-based stabilizer. Preferably, the stabilizer compositions of this invention comprise a mono-organotin compound or mixture of mono-organotin compounds, and, optionally, a diorganotin compound or mixture of diorganotin compounds or mixtures of mono-organotin and di-organotin compounds. Thus, when no diorganotin compound or mixture of diorganotin compounds is employed in the preferred stabilizer of this invention, the mono-organotin compounds will comprise from about 10% to about 90% by weight, preferably about 15% to about 65% by weight of the[]total weight of the stabilizer composition. When it is desirable to utilize a diorganotin compound or mixture of diorganotin compounds in the practice of this invention, said diorganotin compound or mixture of diorganotin compounds may comprise from about 0.05% to about 75%, by weight, preferably from about 0.05% to about 35% by weight of the total weight of the stabilizer composition.

The mono-organotin compounds useful in the compositions of this invention contain one or more tetravalent tin atoms each of which have one direct tin to carbon bond and have structures selected from the following formulas:

     (A)

     (B)

     (C)

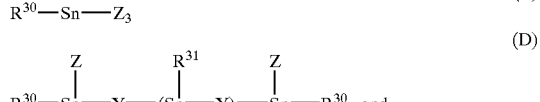     (D)

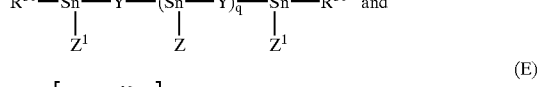     (E)

wherein Z and Z' are the same or different and are selected from

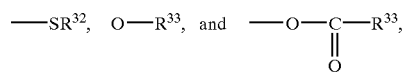

with the proviso that in formula (E) when z=1 and in formulas (C) and (D) at least one Z or Z" is —$SW^{32}$;

Y is

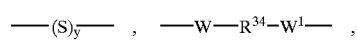

-continued

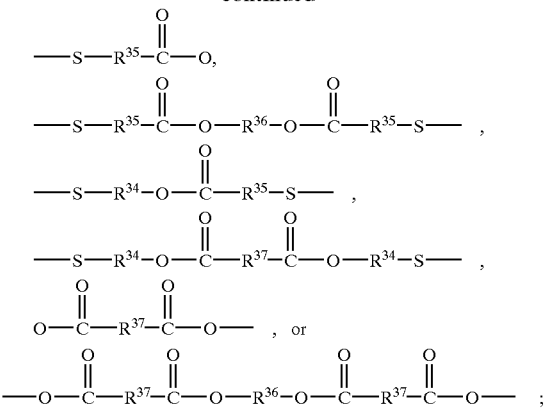

W and $W^1$ are the same or different and are oxygen or sulfur; $R^{30}$ and $R^{31}$ are the same or different and are selected from alkyl, aryl, alkenyl, aralkyl, alkaryl, cycloalkyl, cycloalkenyl,

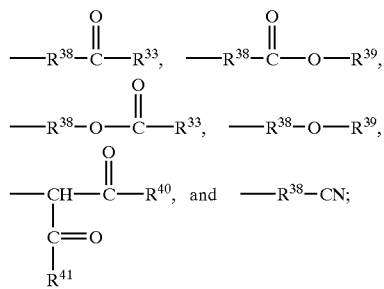

$R^{32}$ is alkyl, alkenyl, aryl, aralkyl, cycloalkyl, cycloalkenyl,

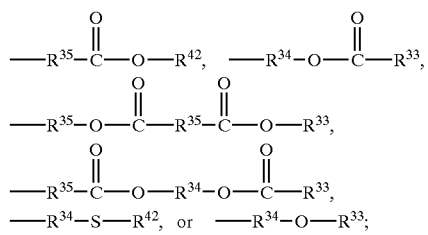

$R^{33}$ is alkyl, alkenyl, aryl, aralkyl, alkaryl, cycloalkyl, or cycloalkenyl;
$R^{34}$ is alkylene of at least 2 carbon atoms, arylene, alkenylene of at least 2 carbon atoms, cycloalkylene, or cycloalkenylene;
$R^{35}$ is alkylene, arylene, alkenylene of at least 2 carbon atoms, cycloalkylene, or cycloalkenylene;
$R^{36}$ is $R^{34}$;
$R^{37}$ is nothing or $R^{35}$;
$R^{38}$ is $C_1$ to $C_4$ alkylenyl;
$R^{39}$ is —H or a monovalent $C_1$ to $C_{20}$ hydrocarbon radical;
$R^{40}$ and $R^{41}$ are the same or different and are each $C_1$ to $C_{22}$ alkyl or $C_1$ to $C_{20}$ alkoxy;
$R^{42}$ —H or $R33$;
q=0 or an integer from 1 to 4 inclusive;
v=an integer from 1 to 8 inclusive; and w=0, 1 or 2, x=0 or 1, z=0 or 1 with the proviso that when x=0 then z=1, when x=1 then z=0 and w=1, when w=2 then x=0 and z=1, and when w=0 then x=0, z=1 and Y is —W—$R^{34}$—$W^1$— or

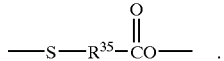

The preferred mono-organotin compounds useful in this invention are those compounds according to formula (A) where $R^{30}$ is methyl, butyl or octyl and W is sulfur; those compounds according to formula (B) where $R^{31}$ is methyl or butyl, W is sulfur, Z is —$SR^{32}$ where $R^{32}$ is

those compounds according to formula (C) where $R^{30}$ is methyl or butyl, Z is —$SR^{32}$ where $R^{32}$ is

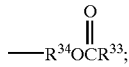

those compounds according to formula (D) where $R^{30}$ is methyl, Z is —$SR^{32}$ where $R^{32}$ is

$R^{31}$ is methyl, Z' is —$SR^{32}$ where $R^{32}$ is

Y is —S—, and q=0; and those compounds according to formula (E) where $R^{30}$ is methyl, Z is —$SR^{32}$ where $R^{32}$ is

$R^{31}$ is methyl, Z' is —$SR^{32}$ where $R^{32}$ is

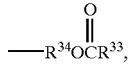

Y is —S—, W=1, x=0, and z=1.

Examples of mono-organotin compounds which are useful in this invention include, but are not limited to, those illustrated in Tables 1–4 below. Thus, representative of the mono-organotin compounds described by formulas (A) and (B) are those illustrated in Table 1 below.

TABLE 1

$$\left[ R^{30}-\underset{\underset{W}{\|}}{Sn} \right]_2 W \quad (A) \qquad R^{31}-\underset{\underset{W}{\|}}{Sn}-Z \quad (B)$$

| Mono-organotin Compound No. | $R^{30}$ | $R^{31}$ | W | Z |
|---|---|---|---|---|
| 1 | —$C_4H_9$ | — | S | — |
| 2 | —$C_8H_{17}$ | — | O | — |
| 3 | — | —$CH_3$ | S | —$SCH_2CH_2OCC_{17}H_{33}$ (O double bond on C) |
| 4 | — | —$CH_3$ | S | —$SCH_2COC_8H_{17}$ (O double bond on C) |
| 5 | — | —$CH_2CH_2COC_4H_9$ (O double bond on C) | S | —$SCH_2CH_2COC_{18}H_{37}$ (O double bond on C) |

Examples of mono-organotin compounds represented by formula (C) are illustrated in Table 2 below.

TABLE 2

$$R^{30}-Sn-Z_3 \quad (C)$$

| Mono-organotin Compound No. | $R^{30}$ | Z |
|---|---|---|
| 6 | —$CH_3$ | —$SCH_2COC_8H_{17}$ (C=O) |
| 7 | —$C_4H_9$ | —$SCH_2CH_2OCC_7H_{15}$ (C=O) |

The mono-organotin compounds illustrated in Table 3 below are representative of compounds described in formula (D).

TABLE 3

$$R^{30}-\underset{\underset{Z^1}{\overset{Z}{|}}}{Sn}-Y-\left(\underset{\underset{Z}{\overset{R^{31}}{|}}}{Sn}-Y\right)_q-\underset{\underset{Z^1}{\overset{Z}{|}}}{Sn}-R^{30} \quad (D)$$

| Mono-organotin Compound No. | $R^{30}$ and $R^{31}$ | Z | $Z^1$ | Y | q |
|---|---|---|---|---|---|
| 8 | —$CH_3$ | —$SCH_2CH_2OCC_{11}H_{23}$ (C=O) | Same as Z | —S— | 0 |
| 9 | | —$CH_2CH_2COC_4H_5$ (C=O) | —$SCH_2CH_2COC_8H_{17}$ (C=O) Same as Z | —S—S— | 0 |
| 10 | —$CH_3$ | —$SCH_2CH_2OCC_{17}H_{33}$ (C=O) | Same as Z | —$SCH_2COC_4H_8OCCH_2S$— (two C=O) | 1 |
| 11 | —$CH_3$ | —$SCH_2CH_2OCCH=CHCOCH_3$ (two C=O) | Same as Z | —S— | 0 |

TABLE 3-continued

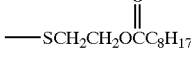
(D)

| Mono-organotin Compound No. | $R^{30}$ and $R^{31}$ | Z | $Z^1$ | Y | q |
|---|---|---|---|---|---|
| 12 | —$C_4H_9$ | —$SCH_2CH_2OCC_8H_{17}$ (with C=O) | Same as Z | —S—$CH_2CO$ (with C=O) | 0 |
| 13 | —$CH_3$ | —$SCH_2CH_2OCC_8H_{17}$ (with C=O) | Same as Z | —S— | 0 |
| 14 | —$C_4H_9$ | —$SCH_2CH_2OCC_8H_{15}$ (with C=O) | Same as Z | —O—(catechol)—O— | 0 |

The mono-organotin compound illustrated in Table 4 below is representative of compounds described by formula (E).

TABLE 4

(E)

| Mono-organotin Compound No. | $R^{30}$ and $R^{31}$ | Z and $Z^1$ | Y | w | x | z |
|---|---|---|---|---|---|---|
| 15 | —$CH_3$ | —$SCH_2CH_2OCC_{17}H_{33}$ (with C=O) | —S— | 1 | 0 | 1 |

As used in Tables 1–3 above, and throughout this specification, the radicals —$C_4H_9$, —$C_8H_{17}$, —$C_{12}H_{25}$, —$C_9H_{19}$ and —$C_{10}H_{21}$ represent n-butyl, n-octyl, n-dodecyl, n-nonyl and n-decyl respectively.

The carboxyl radicals

—$OCC_{17}H_{33}$, —$OCC_{17}H_{35}$, —$OCC_7H_{15}$,
—$OCC_{11}H_{23}$ and —$OCC_8H_{17}$ are derived from oleic acid, scearic acid, n-octanoic acid, lauric acid, and pelargonic acid respectively. Likewise, the radicals —$OC_{13}H_{27}$, —$C_{18}H_{37}$, and —$OC_8H_{17}$, are derived from tridecanol, stearyl alcohol and iso-octanol, respectively.

The diorganotin compounds useful in the practice of this invention contain one or more tetravalent tin atoms, at least one of which has direct bonds to two carbon atoms and have structure selected from the following formulas:

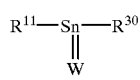
(F)

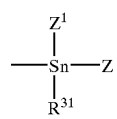
(G)

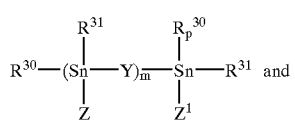
and (H)

-continued

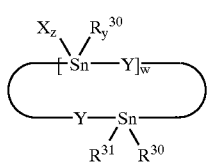
(J)

wherein $R^{30}$, $R^{31}$, W, Z, $Z^1$, Y, w and z are as previously defined;

n=0, 1 or 2, p=0, 1 or 2 with proviso that n+p=2, and m=1 to 5;

y=1 or 2, y=2 with the proviso that when w=0 then Y is —W—$R^{34}$—$W^1$—, or

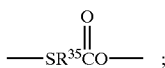

and in formula (J) when z=1 and in formulas (G) and (H) at least one Z or $Z^1$ is —$SR^{32}$.

The preferred diorganotin compounds used in the practice of this invention are those compounds according to formula (F) where R is methyl or butyl, $R^{31}$ is methyl or butyl and W is sulfur; those compounds according to formula (G) where R is methyl or butyl, $R^{31}$ is methyl or butyl, Z is —$SR^{32}$ where $R^{32}$ is

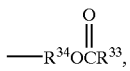

and $Z^1$ is —$SR^{32}$ is

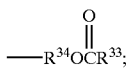

those compounds according to formula (H) where $R^{30}$ is methyl or butyl, $R^{31}$ is methyl or butyl, Y is —S—, Z is —$SR^{32}$ where $R^{32}$ is

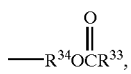

$Z^1$ is —$SR^{32}$ where $R^{32}$ is

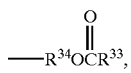

m=1, n=2 and p=0; and those compounds according to formula (J) where $R^{30}$ is methyl or butyl, $R^{31}$ is methyl or butyl, Z is —$SR^{32}$ and $R^{32}$ is

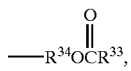

Y is —S—, w=1, y=1 and z=1.

Examples of diorganotin compounds according to formula (F) include, but are not limited to, the compounds illustrated in Table 5 below.

TABLE 5

(F)

$$R^{30}—Sn—R^{31}$$
$$\|$$
$$W$$

| Diorganotin Compound No. | $R^{30}$ | $R^{31}$ | W |
|---|---|---|---|
| 1 | —$C_4H_9$ | —$C_4H_9$ | S |
| 2 | —$C_8H_{17}$ | —$C_8H_{17}$ | O |

Examples of diorganotin compounds according to formula G include, but are not limited to, the compounds in Table 6 below.

TABLE 6

(G)

$$R^{30}—\underset{R^{31}}{\overset{Z^1}{Sn}}—Z$$

| Diorganotin Compound No. | $R^{30}$ | $R^{31}$ | Z and $Z^1$ |
|---|---|---|---|
| C | —$CH_3CH_2COC_4H_9$ (with C=O) | Same as $R^{30}$ | —$SCH_2CH_2OCCH_3$ (with C=O) |
| D | —$CH_3$ | Same as $R^{30}$ | —$SCH_2CH_2OCC_{17}H_{35}$ (with C=O) |

Examples of diorganotin compounds according to formula (H) include, but are not limited to, the compounds in Table 7 below.

TABLE 7

(H)

$$R^{30}-(Sn(R^{31})(Z)-Y)_m-Sn(R^{30})(Z^1)_n-R^{31}$$

| Diorganotin Compound No. | $R^{30}$ and $R^{31}$ | Z | $Z^1$ | Y | n | p | m |
|---|---|---|---|---|---|---|---|
| E | —$CH_3$ | —$SCH_2COC_{13}H_{27}$ (O=) | Same as $R^{30}$ | —S— | 1 | 1 | 1 |
| F | —$C_4H_9$ | —$SCH_2CH_2OCC_8H_{17}$ (O=) | Same as $R^{30}$ | —S— | 1 | 1 | 1 |

Examples of diorganotin compounds according to formula (J) include, but are not limited to, the compounds in Table 8 below.

TABLE 8

(J)

[cyclic structure with $Z_2$, $R^{30}_y$, Sn, Y, $R^{31}$, $R^{30}$]

| Diorganotin Compound No. | $R^{30}$ | $R^{31}$ | Z | Y | w | y | z |
|---|---|---|---|---|---|---|---|
| G | —$C_4H_9$ | —$C_4H_9$ | —$SCH_2CH_2COC_8H_{17}$ (O=) | —S— | 1 | 1 | 1 |

The mono-organotin compounds and diorganotin compounds useful in the compositions of this invention may be prepared by methods well-known in the art such as the reaction of a mono- or dialkyltin chloride with a mercaptoalkyl carboxylate or an alkyl thioglycolate in the presence of a base to scavenge hydrogen chloride. Methyltin trichloride, dimethyltin dichloride, butyltin trichloride, dibutyltin dichloride, ethylhexyltin trichloride, and dioctyltin dichloride are examples of organotin halides that are suitable for the preparation of useful stabilizers for this invention. see for example, U.S. Pat. Nos. 3,565,930, 3,869,487, 3,979,359, 4,118,371, 4,134,878 and 4,183,846 all of which are incorporated herein by reference.

Monosulfides and/or polysulfides of the mercaptoalkyl carboxylates and alkyl thioglycolates are also suitable as metal based stabilizers in the compositions of this invention for improving the resistance of halogen-containing polymers to deterioration when heated to 350° F. (177° C.) during processing. Polysulfides are mixtures of compounds having from 2 to 10 or more sulfur atoms linked together but compounds having from 2 to 4 sulfur atoms are preferred along with the monosulfides. Said sulfides are made by heating stoichiometric quantities of a mercaptoalkyl ester or alkylthiocarboxylate and an organotin chloride in water and ammonium hydroxide to about 30° C. (86° F.), slowly adding an alkali metal mono- or polysulfide, and heating the reaction mixture further to about 45° C. before separating the product from said mixture. The sulfides may be described as a blend of the reaction products which are believed to include the monosulfides and polysulfides of the mercaptoalkylesters and thioglycolates. Said sulfides contain from about 10 to about 42% by weight of tin and from about 8 to about 42% by weight of sulfur. The sulfides of the mercaptoalkyl esters and their preparation are described in U.S. Pat. No. 4,062,881. These sulfides are believed to include the bis[(monoorganotin)bis(mercaptoalkylcarboxylate)]monosulfides and polysulfides, and bis [(diorganotin)mono(mercaptoalkylcarboxylate)] monosulfides and polysulfides, and products which arise during equilibrium reactions among said mono- and polysulfides. The chemical and patent literature contain numerous examples demonstrating that members of different classes of organotin compounds may react with one another under certain conditions to yield products containing one or more tin atoms wherein at least a portion of the tin atoms are bonded to different combinations of radicals than they were before being mixed together.

Conventional non-metallic stabilizers and antioxidants can also be included in the stabilizer compositions of the present invention to assist in improving the properties of the halogen containing resin. Thus, there can be included 0.01–10%, preferably 0.1–5% based on the resin of sulfur containing compounds such as dilauryl-thiodipropionate, distearyl 3,3'-thiodipropionate, dicyclohexyl-3,3-thiodipropionate, dioleyl-3,3 1-thiodipropionate, dibenzyl-3,3'-thiodipropionate, didecyl-3,3'-thiodipropionate, dibenzyl-3,3'-thiodipropionate, diethyl-3,3'-thiopropionate, lauryl ester of 3-methylmercaptopropionic acid, lauryl ester of 3-butylmercaptopropionic acid, lauryl ester of 3-lauryl mercaptopropionic acid, and phenyl ester of 3-octyl mercaptopropionic acid.

Phenolic antioxidants can also be added in an amount of 0.01–10%, preferably 0.1–5% of the halogen-containing resin. Examples of such antioxidants include 2,6-di-t-butyl-p-cresol, butylated hydroxyanisole, propyl gallate, 4,4'-thiobis(6-t-butyl-m-cresol), 4,4'-cyclohexylidenediphenol, 2, 5-di-t-amyl hydroquinone, 4,41-butylidene bis(6-t-butyl-m-cresol), hydroquinone monobenzyl ether, 2, 2'-methylene-bis(4-methyl-6-t-butyl phenol), 2,6-butyl-4-decyloxy phenol, 2-t-butyl-4-dodecyloxy phenol, 2-t-butyl-4-dodecyloxy phenol, 2-t-butyl-4-octadecyloxy phenol, 4,4'-methylene-bis(2,6-di-t-butyl phenol), p-amino phenol, N-lauryloxy-p-amino phenol, 4,4'-thiobis(3-methyl-6-t-butyl phenol), bis [o-(1,1,3,3-tetramethyl butyl)phenol] sulfide, 4-acetyl-β-resorcylic acid, A-stage p-t-butylphenolformaldehyde resin, 4-dodecyloxy-2-hydroxybenzophenone, 3-hydroxy-4-(phenylcarbonyl) phenyl palmitate, n-dodecyl ester of 3-hydroxy-4-(phenyl carbonyl) phenoxyacetic acid, and t-butyl phenol.

The use of epoxy compounds in an amount of 0.01–5% in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin/bis-phenol A resins, phenoxy-propylene oxide, butoxypropylene oxide, epoxidized neopentylene oleate, glycidyl epoxystearate, epoxidized α-olefins, epoxidized glycidyl soyate, dicyclopentadiene dioxide, epoxidized butyl toluate, styrene oxide, dipentene dioxide, glycidol, vinyl cyclo-hexene dioxide, glycidyl ether of resorcinol, glycidol ether of hydroquinone, glycidyl ether of 1,5-dihyroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

Likewise there can be used organic phosphites in an amount of 0.01 to 10%, preferably 0.1–5% of the halogen containing resins. The organic phosphites contain one or more, up to a total of three, aryl, alkyl, aralkyl and alkaryl groups, in any combination. The term "trialkylaryl" is inclusive of alkyl, aryl, alkaryl and aralkyl phosphites containing any assortment of alkyl, aryl, alkaryl and aralkyl groups. Exemplary are triphenyl phosphite, tricresyl phosphite, tri (dimethylphenyl) phosphite, tributyl phosphite, trioctyl phosphite, tridodecyl phosphite, octyl diphenyl phosphite, dioctyl phenyl phosphite, tri(octyl-phenyl) phosphite, tri (nonylphenyl) phosphite, tribenzyl phosphite, butyl dicresyl phosphite, octyl di(octyl-phenyl) phosphite, tri(2-ethylhexyl) phosphite, tritolyl phosphite, tri(2-cyclohexylphenyl) phosphite, tri-alpha-naphthyl phosphite, tri(phenylphenyl) phosphite, and tri(2-phenylethyl) phosphite.

Likewise there can be included polyol stabilizers for vinyl chloride resins in an amount of 0.01–10%. Thus there can be included glycerol, sorbitol, pentaerythritol and mannitol.

Nitrogen containing stabilizers such as dicyandiamide, melamine, urea, formoguanamine, dimethyl hydantoin, guanidine, thiourea, 2-phenylindoles, aminocrotonates, N-alkyl and N-phenyl substituted maleimides, wherein the alkyl group has from 1 to 4 carbon atoms, and the like also can be included in amounts of 0.1–10%. There can even be included conventional lubricants for vinyl chloride resins such as low molecular weight polyethylene, i.e. polyethylene wax, fatty acid amides, e.g. lauramide and stear-amide, bisamides, e.g. decamethylene, bis amide, and fatty acid esters, e.g. butyl stearate, glyceryl stearate, linseed oil, palm oil, decyloleate, corn oil, cottonseed oil, hydrogenated cottonseed oil, etc.

The stabilizer compositions of this invention may be prepared by blending the components thereof in any convenient manner which produces a homogeneous mixture, such as by shaking or stirring in a container. Likewise, the stabilized compositions of this invention can be incorporated in the halogen-containing organic polymer by admixing the stabilizer composition and polymer, such as, for example, in an appropriate mill or mixer or by any other of the well-known methods which provide uniform distribution of the stabilizer throughout the polymer.

The stabilizer compositions of this invention are employed in an amount sufficient to impart the desired resistance to heat deterioration to halogen-containing organic polymers. It will be readily apparent to one of ordinary skill in the art, that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polymer is sub-jected, and the longer the term required for resisting degradation, the greater will be the amount of stabilizer composition required. Generally, as little as about 0.20 part by weight of the stabilizer composition per hundred parts by weight of halogen-containing organic polymer will be effective. While there is no critical upper limit to the amount of stabilizer composition which can be employed, amounts in excess of about 10 parts by weight of halogen-containing organic polymer do not give an increase in effectiveness commensurate with the additional amount of stabilizer employed.

The following examples further illustrate the preparation of blocked mercaptans of this invention, the preparation of stabilizer compositions of this invention, and the advantages of said blocked mercaptans and stabilizer compositions.

EXAMPLES 1–14

The starting materials, the procedure for preparing the latent mercaptans and the percent of residual —SH groups in the latent mercaptan are given in TABLE 9. The total color change of PVC compositions containing said latent mercaptans as part of stabilizer compositions in contrast to that of PVC compositions which are otherwise the same but without the latent mercaptan of this invention are given in TABLE 10.

A standard PVC pipe formulation containing:

| INGREDIENT | AMOUNT |
| --- | --- |
| PVC (Shintech SE950) | 100.00 |
| Calcium carbonate | 5.00 phr |
| Titanium dioxide | 1.00 phr |
| Calcium stearate | 0.60 phr |
| Oxidized polyethylene | 0.15 phr |
| Paraffin wax | 1.20 phr |
| Tin mercaptide of a mercaptoalkyl carboxylate | 0.25 phr | was processed as the Control on a standard two-roll mill at 199° C. with chips taken at one-minute intervals. Then the same formulation except for the addition of the indicated amount of latent mercaptan was also processed on the same roll at the same temperature, taking chips at the same intervals. The total color change (dE), relative to a white tile standard, was measured using a Hunter calorimeter. The dE values given in TABLE 10 for the Control are averages of the values measured in the 12 tests which paralleled the tests of the stabilizer compositions of Examples 1–12.

EXAMPLES 15–18

The standard PVC pipe formulation of Examples 1–14 was used and the heat stabilization afforded by latent mercaptans of FORMULAS 4, 2, and 18 were tested at different levels as shown in Table 11.

TABLE 9

| Example No. | FORMULA | Procedure | % SH |
|---|---|---|---|
| 1 | 2 | A | 0.31 |
| 2 | 3 | A | 0.10 |
| 3* | 4 | A | 0.17 |
| 4 | 10 | A | 0.10 |
| 5 | 11 | B | 0.10 |
| 6 | 12 | C | 0.20 |
| 7 | 13 | B | 13.2 |
| 8 | 14 | A | 0.10 |
| 9 | 15 | E | 0.10 |
| 10 | 16 | D | 0.35 |
| 11 | 17 | D | 0.30 |
| 12** | 18 | A | 0.25 |
| 13 | 21 | A | 0.30 |
| 14 | 25 | C | 0.20 |

*Also contains minor amounts of FORMULAS 5–9.
**Also contains minor amount of 19.

| INGREDIENT | AMOUNT |
|---|---|
| LOXIOL G-16 | 1.00 phr |
| LOXIOL G-70 | 0.70 phr |
| OXIDIZED POLYETHYLENE | 0.20 phr |
| EPOXIDIZED SOYBEAN OIL | 1.00 phr |
| METHYLTINTHIOGLYCOLATE | 1.25 phr | was processed as a Control on a standard two-roll mill (30F/40R) at 187° C. with chips taken at two-minute intervals. Then the same formulation except for decreased stabilizer level and the addition of the amount of latent mercaptan shown below was also processed on the same roll at the same temperature, taking chips at the same intervals. The total color change (dE) was measured versus a white tile standard using a Hunter colorimeter.

TABLE 10

| Example | phr | \multicolumn{10}{c}{dE at One-minute Intervals} |
|---|---|---|---|---|---|---|---|---|---|---|---|

| Example | phr | 1 | 2 | 3 | 4 | 5 | 6 | 7 | 8 | 9 | 10 |
|---|---|---|---|---|---|---|---|---|---|---|---|
| Control | — | 5.6 | 7.2 | 8.1 | 9.4 | 11.2 | 13.7 | 17.0 | 20.8 | 23.8 | 25.7 |
| 1 | 0.10 | 3.9 | 4.2 | 4.6 | 5.5 | 8.3 | 12.1 | 16.6 | 20.0 | 23.6 | 26.7 |
| 2 | 0.15 | 4.0 | 3.9 | 4.7 | 5.5 | 7.0 | 10.3 | 14.0 | 17.6 | 22.1 | 26.2 |
| 3 | 0.15 | 4.0 | 4.7 | 4.6 | 5.2 | 6.7 | 8.5 | 11.3 | 14.1 | 18.0 | 21.3 |
| 4 | 0.28 | 3.9 | 5.0 | 5.5 | 6.1 | 7.6 | 11.7 | 16.7 | 20.5 | 24.2 | 25.5 |
| 5 | 0.25 | 5.3 | 6.2 | 6.8 | 7.7 | 9.3 | 13.8 | 18.3 | 22.1 | 24.2 | 25.5 |
| 6 | 0.04 | 3.0 | 3.5 | 4.4 | 5.8 | 9.5 | 13.8 | 18.3 | 22.2 | 23.9 | 25.6 |
| 7 | 0.12 | 4.9 | 5.7 | 6.5 | 6.8 | 7.6 | 8.9 | 11.1 | 14.3 | 17.1 | 20.9 |
| 8 | 0.15 | 6.6 | 6.7 | 7.0 | 7.2 | 7.8 | 9.9 | 12.3 | 16.3 | 20.1 | 23.3 |
| 9 | 0.20 | 4.3 | 5.3 | 6.3 | 8.5 | 10.9 | 14.6 | 18.6 | 22.2 | 24.5 | 26.8 |
| 10 | 0.30 | 4.9 | 5.2 | 5.6 | 6.5 | 7.5 | 10.6 | 14.8 | 18.5 | 22.0 | 24.2 |
| 11 | 0.25 | 6.3 | 6.6 | 6.5 | 7.0 | 8.2 | 11.6 | 16.0 | 19.4 | 22.0 | 23.1 |
| 12 | 0.10 | 3.5 | 4.3 | 5.4 | 6.4 | 8.0 | 10.7 | 14.1 | 17.4 | 21.4 | 24.7 |
| 13 | 0.10 | 4.1 | 4.7 | 4.7 | 5.5 | 6.7 | 10.0 | 13.8 | 17.4 | 20.1 | 22.8 |
| 14 | 0.10 | 4.7 | 5.6 | 6.0 | 6.6 | 7.3 | 8.2 | 16.3 | 12.9 | 16.1 | 18.6 |

TABLE 11

| Example | FORMULA | phr | 1 | 2 | 3 | 4 | 5 | 6 | 7 | 8 | 9 | 10 |
|---|---|---|---|---|---|---|---|---|---|---|---|---|
| Control | — | — | 5.6 | 7.2 | 8.1 | 9.4 | 11.2 | 13.7 | 17.0 | 20.8 | 23.8 | 25.7 |
| 15 | 4 | 0.28 | 4.2 | 4.6 | 4.9 | 5.9 | 7.6 | 10.7 | 13.0 | 16.5 | 20.2 | 24.6 |
| 16 | 2 | 0.28 | 3.8 | 4.0 | 4.7 | 5.3 | 7.6 | 10.0 | 13.2 | 16.8 | 21.5 | 26.3 |
| 17 | 4 | 0.03 | 4.4 | 5.4 | 5.9 | 6.4 | 6.6 | 7.8 | 10.0 | 12.4 | 14.7 | 17.1 |
| 18 | 18 | 0.05 | 3.5 | 5.4 | 5.3 | 6.2 | 7.5 | 8.7 | 10.2 | 12.7 | 10.3 | 17.8 |

EXAMPLE 19

A standard clear PVC formulation containing:

| INGREDIENT | AMOUNT |
|---|---|
| PVC (OCCIDENTAL 190) | 100.00 |
| PROCESS AID | 1.50 phr |
| IMPACT MODIFIER | 6.00 phr |

| INGREDIENT | AMOUNT (PHR) |
|---|---|
| METHYLTINTHIOGLYCOLATE | 1.00 |
| COMPOUND #4 | 0.25 |

TABLE 12

| | dE at Two Minute Intervals | | | | | | | | | | |
|---|---|---|---|---|---|---|---|---|---|---|---|
| | 2 | 4 | 6 | 8 | 10 | 12 | 14 | 16 | 18 | 20 | 22 |
| Control | 15.0 | 15.9 | 17.1 | 17.3 | 18.7 | 20.1 | 21.5 | 23.6 | 26.8 | 31.7 | 38.2 |
| Ex. 19 | 15.1 | 14.6 | 15.1 | 15.4 | 15.7 | 16.9 | 18.5 | 20.7 | 23.7 | 27.3 | 34.5 |

EXAMPLE 20

$^1$H-NMR spectroscopy was used to determine the molecular structure of 2-S-(tetrahydropyranyl)thioethyldecanoate (FORMULA 24) which was prepared by adding 42.0 grams (0.50 mole) of 3,4-dihydropyran to 112.2 grams (0.50 equivalent) of mercaptoethyldecanoate (14.7% SH) over a period of 45 minutes while maintaining a nitrogen atmosphere and a temperature below 35° C. and then heating it to 50° C. and holding that temperature for 1.5 hours. After cooling the solution, it was washed with two 200 ml portions of a 10% sodium bicarbonate solution in water, followed by a 200 ml wash with water. The organic layer was dried with $MgSO_4$ to yield a light yellow liquid having an SH content of less than 0.5 percent as determined by titration with a 0.100 N iodine solution in isopropanol. The $^1$H-NMR (CDCl$_3$, δ) spectrum was: 2.3 (2H, t, —C(=O)—C$\underline{H}_2$—CH$_2$), 2.8 (2H, m, —S—C$\underline{H}_2$—CH$_2$—), 4.2 (2H, m, —S—CH$_2$C$\underline{H}_2$—O—), 4.9 (1H, m, —O—C$\underline{H}$(—S—CH$_2$—)—CH$_2$—CH$_2$—). The total color change (dE) of a PVC composition containing 0.13 phr of the latent mercaptan of this example was measured versus a white tile standard using a Hunter calorimeter at one mintue intervals. At one minute, it was 4.2; at five mintues, it was 8.4.

EXAMPLE 21

$^1$H-NMR spectroscopy was used to determine the molecular structure of 1-S-(2-hydroxyethylthio)-1-phenylmethane (FORMULA 11) which was prepared by adding 135.0 grams of a 20% methanol solution of sodium methoxide to 39.1 grams (0.50 mole) of 2-mercaptoethanol and 63.3 (0.50 mole) grams of benzyl chloride under nitrogen over a period of 45 minutes while keeping the temperature below 50° C., then heating the solution to 60° C. and holding it there for 6 hours. After cooling the solution, it was washed with two 200 ml portions of water, dried with magnesium sulfate, and stripped of solvent at 90° C. and 10 mm Hg to yield a light yellow liquid having an SH contemt of less than 0.5 percent as determined by titration with a 0.100N iodine solution in isopropanol. The $^1$H-NMR (CDCl$_3$, δ) spectrum was: 2.6 (2H, t, —S—C$\underline{H}_2$—CH$_2$—OH), 3.6 (2H, t, —CH$_2$—C$\underline{H}_2$—OH), 3.7 (2H, s, Ar—C$\underline{H}_2$—S—), 7.3 (5H, m, Ar—H); the $^{13}$C-NMR (CDCl$_3$, δ) spectrum was 33.9 (—S—$\underline{C}$H$_2$—), 35.8 (Ar—$\underline{C}$H$_2$—) and 126.9–138.6 (Ar).

EXAMPLE 22

$^1$H-NMR spectroscopy was used to determine the molecular structure of 1-S-(2-hydroxyethylthio)-1-(2-hydroxyphenyl)methane (FORMULA 12) which was prepared by heating a stirred mixture of 31.5 grams (0.40 mole) of 2-mercaptoethanol and 50 grams (0.40 mole) of 2-hydroxy benzyl alcohol in 75 grams of toluene to 40° C. under nitrogen and adding 0.21 gram of 70% methanesulfonic acid, heating it to 65° C. and holding it there for 45 minutes. After cooling the solution, it was washed with 100 mls of 10% aqueous sodium bicarbonate and 100 mls of water, dried with magnesium sulfate, and stripped of solvent at 50° C. and 10 mm Hg to yield a tan viscous oil having an SH content of less than 0.3 percent as determined by titration with a 0.100N iodine solution in isopropanol. The product was purified by column chromatography through silica gel using ethyl acetate/methanol as the elution solvent to obtain a light yellow oil. The $^1$H-NMR (CDCl$_3$, δ) spectrum was: 2.5 (2H, t, —S—C$\underline{H}_2$—CH$_2$—), 3.6 (2H, t, —CH$_2$—C$\underline{H}_2$—OH), 3.7 (2H, s, Ar—C$\underline{H}_2$—S—), 6.6–7.2 (5H, m, Ar—$\underline{H}$); the $^{13}$C-NMR (CDCl$_3$, δ) spectrum was 31.1 (—S—$\underline{C}$H$_2$CH$_2$—), 33.5 (Ar—$\underline{C}$H$_2$—S—), 61.1 (—CH$_2$$\underline{C}$H$_2$—OH and 116.5–154.3 (Ar).

EXAMPLE 23

$^1$H-NMR spectroscopy was used to determine the molecular structure of 1-S-(2-hydroxyethylthio)-1-methyl-1-N-pyrrolidinonylmethane (FORMULA 2) which was prepared by adding 55.57 grams (0.50 mole) of 1-vinyl-2 pyrrolidinone with stirring to a solution of 39.06 grams (0.50 mole) of 2-mercaptoethanol and 0.14 gram of 70% methanesulfonic acid while maintaining the temperature below 40° C. and an atmosphere of nitrogen in the reaction vessel. The reaction mixture was heated to 60° C. and held there for one hour. After cooling the solution, it was diluted with 75 mls of diethyl ether; washed with two 100 ml portions of water and 25 mls of saturated aqueous sodium bicarbonate, dried with magnesium sulfate, and stripped of solvent at 50° C. and 10 mm Hg to yield a light yellow oil having an SH content of less than 0.5 percent as determined by titration with a 0.100N iodine solution in isopropanol. The $^1$H-NMR (CDCl$_3$, δ) spectrum was: 1.4 (3H, d, C$\underline{H}_3$—CH<), 2.1 (2H, q,)N—CH$_2$—C$\underline{H}_2$—CH$_2$—), 2.4 (2H, t, —S—C$\underline{H}_2$—CH$_2$—), 2.5 (2H, t, —C$\underline{H}_2$—C(=O)—), 3.4 (2H, t, —CH$_2$—C$\underline{H}_2$—N<), 3.7 (2H, t, —CH$_2$C$\underline{H}_2$—OH), 5.6 (1H, q,>N—C$\underline{H}$(—CH$_3$) —S—); the $^{13}$C-NMR (CDCl$_3$, δ) spectrum was 17.7 (<CH—$\underline{C}$H$_3$), 19.2 (—CH$_2$—$\underline{C}$H$_2$—CH$_2$—), 31.3 (CH$_2$—$\underline{C}$H$_2$—C(=O)—), 33.4 (—S—$\underline{C}$H$_2$CH$_2$—), 41.8 (>N—$\underline{C}$H$_2$—CH$_2$—), 51.5 (>N—$\underline{C}$H—(CH3)—S—), 61.6 (—S—CH$_2$$\underline{C}$H$_2$—OH). 175.5 (—$\underline{C}$H$_2$C(=O)—N<).

EXAMPLE 24

To 28.4 grams (0.36 mole) of 2-mercaptoethanol under nitrogen, there was added 0.22 gram of p-toluenesulfonic acid, immediately followed by the addition of 60.0 grams (0.36 mole) of cresyl glycidyl ether with stirring over a period of 60 minutes while maintaining the temperature at 50° C. The mixture was then heated to 65° C. and held there for 2.5 hours. After cooling, the solution was washed with sodium bicarbonate two-150 ml portions of water containing 25 mls of saturated aqueous sodium bicarbonate solution, then dried with magnesium sulfate to yield a clear oil with <0.4% SH as determined by titration with 0.100 N iodine solution in isopropanol. The molecular structure of the product, 2-hydroxy-3-(2-hydroxyethylthio)propyl o-methylphenyl ether (FORMULA 16), was determined by $^1$H-NMR and $^{13}$C-NMR spectroscopy. $^1$H-NMR (CD$_3$COCD$_3$, δ): 2.2 (3H, s, ArC$\underline{H}_3$), 2.8 (4H, m, —C$\underline{H}_2$—S—), 3.7 (2H, m, —C$\underline{H}_2$—OH), 4.1 (2H, dd, Ar—O—C$\underline{H}_2$—), 4.6 (1H, m,—C$\underline{H}$(OH)—, 6.8–7.2 (4H, m, Ar—$\underline{H}$); $^{13}$C-NMR (CD$_3$COCD$_3$, δ): 16.3 (Ar—$\underline{C}$H$_3$), 36.8 (—S—$\underline{C}$H$_2$—), 62.3 (—$\underline{C}$H$_2$—OH), 70.1 (>$\underline{C}$H—OH), 70.5 (Ar—O—$\underline{C}$H$_2$—), 111.9–157.8 (Ar).

EXAMPLES 25 & 26

As another aspect of this invention, it has been discovered that antioxidants activate the latent mercaptans to enhance the heat stability of PVC compositions during processing. The PVC pipe formulations of Example 25 (latent mercaptan alone) and Example 26 (latent mercaptan+an antioxidant) are compared with the Control and Comparative Example 1 (CE 1) in TABLE 14. Each was processed on a standard two-roll mill at 199° C. Chips of the PVC formulation were taken at one-minute intervals. The enhanced heat stability of the formulation of Example 26 is evident. As a comparison of the results for the Control and CE 1 shows, the antioxidant does not, by itself, enhance the effect of the alkyltin mercaptide.

|  | EXAMPLE | | | |
|---|---|---|---|---|
| INGREDIENT | Control | 25 | 26 | CompEx 1 |
| PVC (Shintech SE950) | 100.00 | 100.00 | 100.0 | 100.00 |
| Calcium carbonate | 5.00 | 5.00 | 5.00 | 5.00 |
| Titanium dioxide | 1.00 | 1.00 | 1.00 | 1.00 |
| Calcium stearate | 0.60 | 0.60 | 0.60 | 0.60 |
| Oxidized polyethylene | 0.15 | 0.15 | 0.15 | 0.15 |
| Paraffin wax | 1.20 | 1.20 | 1.20 | 1.20 |
| Alkyltin mercaptide of a mercaptoalkyl carboxylate | 0.25 | 0.25 | 0.25 | 0.25 |
| Latent mercaptan * | 0.00 | 0.15 | 0.15 | 0.00 |
| IRGANOX 1010 antioxidant | 0.00 | 0.00 | 0.20 | 0.20 |

* Isomers of FORMULAS 4–9

TABLE 14

| | dE values at One Minute Intervals | | | | | | | | | | |
|---|---|---|---|---|---|---|---|---|---|---|---|
| Ex. No. | 1 | 2 | 3 | 4 | 5 | 6 | 7 | 8 | 9 | 10 | 11 |
| Cont. | 6.2 | 7.5 | 8.3 | 9.5 | 11.2 | 13.2 | 16.8 | 20.6 | 23.7 | 25.2 | 27.2 |
| 25 | 4.0 | 4.8 | 5.0 | 5.6 | 7.1 | 9.4 | 12.7 | 15.6 | 18.7 | 22.0 | 25.2 |
| 26 | 4.3 | 4.6 | 5.0 | 5.2 | 5.9 | 7.7 | 10.2 | 13.2 | 15.8 | 18.8 | 21.5 |
| CE 1 | 5.3 | 7.6 | 8.3 | 9.3 | 11.0 | 13.1 | 16.8 | 20.0 | 23.2 | 25.1 | 26.6 |

As was mentioned above, the latent mercaptans of this invention are also intermediates for the preparation of primary heat stabilizers, anti-oxidants, anti-microbial agents, odor masks, and photostabilizers. Primary heat stabilizers, for example, may be made from latent mercaptans having a phenolic, carboxylate, or a free mercaptan functionality by reaction with a metal or organometal oxide, hydroxide, or halide such as calcium hydroxide, barium hydroxide, methyltin trichloride and dimethyltin dichloride. Phenols, for example, yield compounds having the general formula $AB_b$ 

wherein A is Sn, Ba, Ca, Al, Mg, monoalkyltin, dialkyltin, trialkyl tin, B is

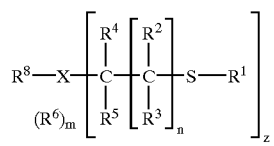

m and n are 0 or 1, X is aryl, alkaryl, or haloaryl, $R^1$ through $R^6$ are the same as above, $R^8$ is O or S, z is 1 or 2, and b is from 1 to 4.

As another aspect of this invention then, a compound of the Formula $AB_b$ wherein A is dibutyltin, B is

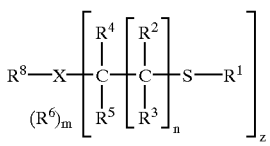

m=0, n=0, z=1; X is phenyl, $R^4$ and $R^5$ are hydrogen, $R^8$ is O, $R^1$ is hydroxyethyl and b is 2, was prepared by the reaction of dibutyltin oxide with 1-S-(2-hydroxyethylthio)-1-(2-hydroxyphenylmethane) (FORMULA 12) as further described in Example 27.

EXAMPLE 27 and COMPARATIVE EXAMPLE 2

Twenty grams (0.08 mole) of dibutyltin oxide, 29.61 grams (0.16 mole) of 1-S-(2-hydroxyethylthio)-1-(2-hydroxyphenylmethane), and 150 mls of toluene were heated under a nitrogen atmosphere in a round bottom flask equipped with a Dean-Stark trap. The azeotropic distillation of water was carried out at 108–111° C. and the theoretical amount (0.7 ml) was collected after about two hours. The toluene was removed by distillation at 10 mm Hg and a maximum temperature of 110° C. A yellow oil having little or no odor was obtained. The theoretical tin content is 19.7%; the tin content found was 20.2%. A satisfactory product of this invention was thus obtained.

In TABLE 15, the stabilization of a standard PVC pipe formulation by the product of Example 27 at a level of 0.25 phr is compared with that of dibutyltin diphenate at the same level (Comparative Example 2, made according to the general procedure of Example 27 except that phenol was substituted for the 1-S-(2-hydroxyethylthio)-1-(2-hydroxyphenylmethane). The resulting formulations were processed on a standard two-roll mill at 199° C. with chips being taken at one-minute intervals. The standard formulation, as follows, was tested as the Control:

| PVC (Shintech SE950) | 100.00 |
|---|---|
| Calcium carbonate | 5.00 |
| Titanium dioxide | 1.00 |
| Calcium stearate | 0.60 |
| Oxidized polyethylene | 0.15 |
| Paraffin wax | 1.20 |

TABLE 15

| | dE at One-minute Intervals | | | | | |
|---|---|---|---|---|---|---|
| Example | 1 | 2 | 3 | 4 | 5 | 6 |
| Control | 19.4 | 33.5 | 40.3 | 43.0 | 40.3 | 39.3 |
| Comp Ex 2 | 12.4 | 22.1 | 33.0 | 35.7 | 35.7 | 34.1 |
| 27 | 7.9 | 15.3 | 21.7 | 29.5 | 36.8 | 41.3 |

EXAMPLE 28

To a solution containing 22.58 grams (0.106 mole) 1-S-hydroxyethylthiol-1-(2-hydroxyphenyl) propane, 14.47 grams (0.053 mole) 2-mercaptoethyl-(4-methoxybenzyl) thioacetate, 17.94 grams (0.177 mole) triethylamine, and 50 ml of dichloromethane is added dropwise over a period of one hour at 8° C. a solution of 15.00 grams (0.053 mole) of butyltintrichloride in 50 ml dichloromethane with stirring under a nitrogen atmosphere. The solution is then slowly warmed to 40° C. and held for one hour after which it is cooled to room temperature, transferred to a separatory funnel, and washed twice with 150 ml of water. After drying with magnesium sulfate, the product is stripped of solvent at 50° C. under 15 mm pressure to yield an amber oil. The product was analyzed for tin content, 14.5% (14.2% theory), and titratable SH, 4.0% (4.0% theory). A satisfactory product of this invention was thus obtained. In the $AB_b$ formula for this product, A is monobutyltin, B is the same as in Example 27, and b is 3.

A standard pipe formulation containing the following components:

| INGREDIENT | AMOUNT |
|---|---|
| PVC (Shintech SE950) | 100.00 |
| Calcium carbonate | 5.00 phr |
| Titanium dioxide | 1.00 phr |
| Paraffin wax | 1.20 phr |
| Calcium stearate | 0.60 phr |
| Oxidized Polyethylene | 0.15 phr | was processed with 0.27 phr of the above protected mercaptan stabilizer and in the absence of stabilizer (CONTROL) on a standard two-roll mill (30F/40R) at 199° C. with chips taken at one minute intervals. The total color change (dE) was measured versus a white tile standard using a Hunter calorimeter and is shown in Table 16.

TABLE 16

| | dE at One-minute Intervals | | | | | | | | | |
|---|---|---|---|---|---|---|---|---|---|---|
| Example | 1 | 2 | 3 | 4 | 5 | 6 | 7 | 8 | 9 | 10 |
| Control | 19.0 | 30.8 | 37.4 | 41.5 | 41.4 | 41.8 | 41.9 | 38.6 | 37.6 | 36.2 |
| 28 | 5.8 | 8.0 | 9.7 | 11.0 | 12.9 | 15.2 | 17.1 | 19.4 | 22.3 | 24.3 |

Anti-oxidants also may be made from latent mercaptans having a phenolic or hydroxyl group by their reaction with phosphorus trichloride or a phosphite having one, two, or three alkoxy, aryloxy, aralkoxy, alkaryloxy, or haloaryloxy groups to give a $PQ_pB_{3-p}$ compound wherein P is phosphorus, Q is an alkoxy, aryloxy, aralkoxy, alkaryloxy, or haloaryloxy radical, p is 1 or 2 and B is

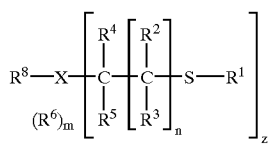

wherein n is 0 or 1; z is 1 or 2; $R^1$ through $R^6$ are as above in Formula 1, X is aryl, haloaryl, or arylcycloalkyl, and $R^8$ is 0.

Also, the latent mercaptans of this invention wherein the blocking or protecting group includes chemical functionality may provide additional benefit in polymer processing and/or performance. The disagreeable odor generated by primary mercaptan-containing stabilizers during the processing of PVC is masked by latent mercaptans exemplified by the compound of FORMULA 21, the compound of FORMULA 25 and their isomers and homologs, as otherwise defined by Formula 1, at concentrations as small as about 0.01 part of the latent mercaptan per hundred parts of the halogenated polymer. Much larger amounts of the latent mercaptan may, of course, be used but the maximum amount necessary to effect the masking is about 0.1 phr and the preferred amount is about 0.05 phr. Thus, this invention provides a means for masking the odor of mercaptans while maintaining the function of the mercaptan as a synergist for improved color-hold.

It also has been found that the latent mercaptans of this invention are useful as the sole heat stabilizer for a flexible PVC formulation. Suitably, the amount of the latent mercaptan for this use may be from about 1% to about 10% by weight of the total weight of the stabilized PVC composition. This use of the latent mercaptans of this invention is exemplified in Examples 29 and 30 and by the test results shown in Table 17.

EXAMPLES 29 and 30

A standard flexible PVC formulation containing:

| INGREDIENT | AMOUNT |
|---|---|
| PVC (GEON 30) | 100.0 |
| DIOCTYL PHTHALATE | 25.0 phr |
| EPOXIDIZED SOYBEAN OIL | 4.0 phr |
| OXIDIZED POLYETHYLENE | 0.2 phr |
| STEARIC ACID | 0.5 phr | was processed using a Brabender Plasticorder at 200° C./80 rpm with chips being taken at two minute intervals. Then the same formulation except for the addition of 5.0 phr of the latent mercaptan of the Formula indicated in Table 17 was also processed at the same intervals. The total color change (dE) was measured versus a white tile standard using a Hunter calorimeter.

EXAMPLE 31

A standard flexible PVC formulation containing:

| INGREDIENT | AMOUNT |
|---|---|
| PVC (GEON 30) | 100.00 |
| DIOCTYL PHTHALATE | 25.00 phr |
| EPOXIDIZED SOYBEAN OIL | 4.00 phr |
| STEARIC ACID | 0.50 phr |

| INGREDIENT | AMOUNT |
|---|---|
| OXIDIZED POLYETHYLENE | 0.20 phr |
| HYDROTALCITE | 2.00 phr | was processed using a Brabender Plasticorder at 200° C./80 rpm with chips taken at two minute intervals. Then the same formulation except for a decreased part level of hydrotalcite, 1.00 phr, in conjunction with latent mercaptan (CMPD #4), 1.00 phr, was also processed at the same intervals. The total color change (dE), measured versus a white tile standard using a Hunter calorimeter, is shown in Table 18.

was processed as a Control using a Brabender Plasticorder at 200° C./80 rpm with chips being taken at two minute intervals. Then the same formulation except for the addition of 2.0 phr of the latent mercaptan of Formula 4 was also processed at the same intervals. The total color change (dE) was measured versus a white tile standard using a Hunter calorimeter.

EXAMPLE 33

A flexible PVC formulation, similar to that of Example 32 except that the amounts of dioctyl phthalate and epoxidized soy bean oil were 40 and 8.58 phr, respectively, and the phenate was replaced by a mixture of a methyltin carboxylate (0.60 phr) and a zinc carboxylate (0.27 phr) was used as a Control and 0.75 phr of the latent mercaptan of Formula

TABLE 17

| Example | dE at Two-minute Intervals | | | | | | | | | | |
|---|---|---|---|---|---|---|---|---|---|---|---|
| | 2 | 4 | 6 | 8 | 10 | 12 | 14 | 16 | 18 | 20 | 22 |
| Control | 49.4 | 73.3 | 78.1 | 80.3 | 78.3 | 77.3 | 77.9 | 76.2 | 77.7 | 83.5 | 82.7 |
| 29 Formula #4 | 28.3 | 41.0 | 44.6 | 48.6 | 48.4 | 52.0 | 51.6 | 50.5 | 52.0 | 50.2 | 51.5 |
| 30 Formula #18 | 33.0 | 43.7 | 47.4 | 49.3 | 50.0 | 51.4 | 53.1 | 55.0 | 60.4 | 64.5 | 67.2 |

TABLE 18

| Ex. | dE at Two-minute Intervals | | | | | | | | | | | |
|---|---|---|---|---|---|---|---|---|---|---|---|---|
| | 2 | 4 | 6 | 8 | 10 | 12 | 14 | 16 | 18 | 20 | 22 | 24 |
| Cont. | 30.0 | 36.3 | 42.3 | 48.3 | 52.3 | 55.8 | 66.0 | 82.9 | 84.5 | CHARRED | — | |
| 31 | 28.5 | 36.0 | 42.2 | 44.9 | 45.2 | 47.4 | 58.2 | 73.5 | 73.7 | 70.7 | 68.7 | 66.3 |

The use of the latent mercaptans of this invention along with a mixed metal heat stabilizer for flexible PVC formulations is shown in the following example.

EXAMPLE 32

A standard flexible PVC formulation containing:

| INGREDIENT | AMOUNT |
|---|---|
| PVC (GEON 30) | 100.0 |
| DIOCTYL PHTHALATE | 25.0 phr |
| EPOXIDIZED SOYBEAN OIL | 4.0 phr |
| OXIDIZED POLYETHYLENE | 0.2 phr |
| STEARIC ACID | 0.5 phr |
| Ba/Zn PHENATE | 2.5 phr |

4 was added to exemplify this invention. Each was processed as in Example 32 except that the Plasticorder was operated at 60 rpm. The color changes of the formulations of Examples 32 and 33 are given in Table 19.

TABLE 19

| Example | dE at Two-minute Intervals | | | | | | | | | | |
|---|---|---|---|---|---|---|---|---|---|---|---|
| Minutes | 2 | 4 | 6 | 8 | 10 | 12 | 14 | 16 | 18 | 20 | 22 |
| Control (32) | 23.1 | 21.1 | 20.8 | 20.9 | 19.9 | 20.8 | 24.7 | 27.2 | 33.2 | 41.2 | 51.2 |
| 32 | 21.4 | 21.1 | 20.9 | 21.9 | 22.6 | 25.8 | 26.0 | 31.1 | 35.0 | 39.2 | 42.9 |
| Control (33) | 26.1 | 27.4 | 27.6 | 29.2 | 30.1 | 31.6 | 33.6 | 33.5 | 38.1 | 38.8 | 39.5 |
| 33 | 24.8 | 24.1 | 24.3 | 24.3 | 23.7 | 24.7 | 25.5 | 24.8 | 26.7 | 26.3 | 28.0 |

TABLE 19-continued

| | dE at Two-minute Intervals | | | | | | | | |
|---|---|---|---|---|---|---|---|---|---|
| Minutes | 24 | 26 | 28 | 30 | 32 | 34 | 36 | 38 | |
| Control 32 | (CHARRED) 43.8 | 48.5 | 51.1 | 52.3 | 55.5 | 61.5 | 74.0 | (CHARRED) | |

Example 34 below illustrates the use of a hybrid mercaptan of this invention which contains both a blocked mercapto group and a free mercaptan group. The hybrid structures, as in FORMULA 13 above, function as ligands for metallic-based stabilizers and as heat stabilizers by themselves. Table 20 shows the improved early color when the hybrid is used.

EXAMPLE 34 and Comparative Example 3

A standard PVC pipe formulation containing:

| INGREDIENT | AMOUNT |
|---|---|
| PVC (Shintech SE 950) | 100.00 |
| Calcium carbonate | 5.00 phr |
| Titanium dioxide | 1.00 phr |
| Paraffin wax | 1.20 phr |
| Calcium stearate | 0.60 phr |
| Oxidized polyethylene | 0.15 phr |
| Tin mercaptide of a mercapto-alkyl carboxylate | 0.25 phr | was processed as a Control on a dynamic two-roll mill at 199° C. (30F/40R) with chips being taken at one minute intervals. Then the same formulation except for the addition of 0.11 phr of 2-mercaptoethylcaprate (Comparative Example 3) or 0.12 phr of the latent mercaptan of FORMULA 13 was processed at the same intervals. The total color change (dE) was measured versus a white tile standard using a Hunter calorimeter.

TABLE 20

| | dE at One-minute Intervals | | | | | | | | | | |
|---|---|---|---|---|---|---|---|---|---|---|---|
| Example | 1 | 2 | 3 | 4 | 5 | 6 | 7 | 8 | 9 | 10 | 11 |
| Control | 5.7 | 7.6 | 8.8 | 9.6 | 11.4 | 13.1 | 16.5 | 19.7 | 22.9 | 25.2 | 26.6 |
| CE 3 | 6.0 | 7.0 | 7.4 | 8.1 | 9.2 | 10.5 | 12.7 | 14.8 | 18.0 | 21.7 | 24.6 |
| 34 Formula #13 | 4.9 | 5.7 | 6.5 | 6.8 | 7.6 | 8.9 | 11.1 | 14.3 | 17.1 | 20.9 | 24.3 |

Latent mercaptans exemplified by the compounds of FORMULAS 12 and 20 have anti-oxidant properties that may find use in improving polymer processing and polymer performance. A compound of FORMULA 23 acts as a photostabilizer in a polymer to retard discoloration and loss of physical properties caused by ultra-violet radiation.

The tendency of a free mercaptan to deactivate a biocide in a product containing a heat stabilizer composition as well is negated by the use of a latent mercaptan of this invention in combination with a metal-based stabilizer as the heat stabilizer composition. The latent mercaptan prepared by the reaction of 3,4-dihydropyran and 2-mercaptoethanol (Formula 4), for example, when tested at a level of 0.5 phr in vinyl films containing dibutyltin bis(2-phenylphenate) had no detrimental effect on the anti-microbial activity of OBPA and Vinyzene® antimicrobials against *staphylococcus aureus* and *klebsiella pneumoniae* bacteria and a fungal mix including *aspergillus niger, penicillium pinophylium, chaetomium globosum, aureobasidium pullulans,* and *gliocladium virens*.

A novel, commercially attractive method for making highly active PVC heat stabilizers which often function also as anti-oxidants, UV stabilizers, odor masks, and/or anti-microbial agents has been developed. It is cost-effective and straightforward. The method comprises the reaction of a para-substituted phenol with formaldehyde and an alkali metal hydroxide in dilute aqueous solution at a temperature up to about 60° C., preferably a maximum of about 50° C., and still more preferably from about 35° to about 50° C. The condensation is quenched by cooling the reaction mixture below 20° C. to as low as about 0° C., the mixture is neutralized, the resultant condensate is isolated without further purification and is further condensed with a mercaptan-containing compound such as is described hereinabove according to Procedure C, also described hereinabove. On an equivalent weight basis, the ratio of the phenol to formaldehyde is from 1:1 to about 1:1.25 and the ratio of the phenol to alkali metal hydroxide is about 1:1 but a 5 to 10% excess may be used. The total concentration of the phenol and formaldehyde reactants in the aqueous hydroxymethylation of the phenol is from about 25 to about 50% by weight. Examples of suitable phenols include bisphenol A, 4,4'-dihydroxydiphenyl sulfone (bisphenol S), p-nonylphenol, p-tert-butylphenol, 2,4-di-tert-butylphenol, p-methoxyphenol, p-propylphenol, and p-cresol. Typical sources of formaldehyde include aqueous solutions thereof, paraformaldehyde, neat formaldehyde, and cyclic oligomers thereof.

Examples 35–37 below illustrate the novel method and the activity of the latent mercaptans produced is shown in Tables 21 and 22.

EXAMPLE 35

A nitrogen atmosphere is maintained in a 500 ml 3-neck flask equipped with a condenser and a thermocouple while 20.0 grams (0.122 mole) of 4-allyl-2-methoxyphenol (also known as eugenol) and 100 ml of 5.14 weight/volume % of of aqueous sodium hydroxide solution are mixed with stirring while maintaining the temperature of the reaction mixture under 35° C. When the mixture becomes homogeneous, 12.36 grams (0.153 mole) of 37% aqueous formaldehyde solution is added over a ten minute period at 35° C. and then the mixture is slowly heated to 50° C. and held there for 3.5 hours, cooled, mixed with 100 ml of ethyl acetate and slowly acidified with dilute hydrochloric acid to a pH of 3 with rapid stirring while maintaining the temperature under 20° C. The organic layer is separated and then combined with a 100 ml ethyl acetate extract of the aqueous layer. The ethyl acetate solution is dried with magnesium sulfate and stripped of solvent at 45° C./15 mm Hg for one hour. Both $^1$H and $^{13}$C NMR confirm that the amber liquid residue conforms to the desired intermediate, 4-allyl-2-methoxy-6-hydroxymethyl phenol. Then, a nitrogen atmosphere is established in a 3-neck, 250 ml flask equipped with a condenser and a thermocouple and maintained while 20.0 grams (0.103 mole) of the intermediate and 8.05 grams (0.103 mole) of 2-mercaptoethanol, and 100 ml of toluene, are stirred until homogeneous. The solution is heated to 40° C., 0.06 gram of methanesulfonic acid is added, and the solution is further heated to 65–70° C. for 3 hours. The solution is cooled to 25° C., transferred to a separatory funnel and washed with a saturated sodium bicarbonate solution to neutrality, dried with magnesium sulfate, and stripped at 40° C./5 mm Hg for one hour. The residue is an amber liquid of pleasant odor with 0.1% residual —SH content, as determined by 0.100 N iodine titration in isopropanol. Both $^1$H and $^{13}$C NMR confirm that the residue is 4-allyl-2-methoxy-6-(2-hydroxyethyl-1S-thiomethyl) phenol as the major product and unreacted intemediate as the remainder.

EXAMPLE 36

The general procedure of Example 35 was repeated except that 50 grams (0.333 mole) of p-tert-butyl phenol was used, along with 14 grams (0.35 mole) of 98% sodium hydroxide and 33.73 grams (0.416 mole) of the formaldehyde solution to obtain the intermediate 2-hydroxymethyl-4-tert-butyl phenol. The desired product, 2-(2-hydroxyethyl) thiomethyl-4-tert-butyl phenol, was obtained from 17.2 grams (0.095 mole) of the intermediate and 7.4 grams of the 2-mercaptoethanol (0.095 mole) in 50 ml of toluene, along with 0.10 gram of the catalyst. Structural formula 26 for the product was confirmed by $^1$H and $^{13}$C NMR.

Formula 26

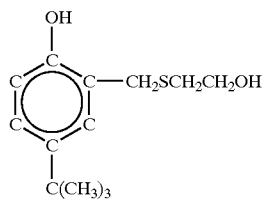

EXAMPLE 37

The general procedure of Example 35 was repeated except that 50 grams of p-nonyl phenol (0.227 mole) was used, along with 9.73 grams (0.238 mole) of 98% sodium hydroxide and 23.0 grams (0.284 mole) of the formaldehyde solution to obtain the intermediate 2-hydroxymethyl-4-nonyl phenol. The desired product, 2-(2-hydroxyethyl) thiomethyl-4-nonyl phenol, was obtained from 23.85 grams (0.095 mole) of the intermediate and 7.4 grams of the 2-mercaptoethanol (0.095 mole) in 50 ml of toluene, along with 0.10 gram of the catalyst. Structural formula 27 for the product was confirmed by $^1$H and $^{13}$C NMR.

Formula 27

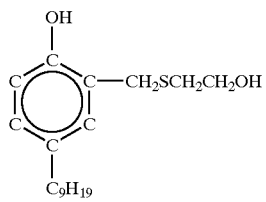

EXAMPLES 38–39

A standard PVC pipe formulation containing:

| INGREDIENT | AMOUNT |
|---|---|
| PVC (Shintech SE 950) | 100.00 |
| Calcium carbonate | 5.00 phr |
| Titanium dioxide | 1.00 phr |
| Paraffin wax | 1.20 phr |
| Calcium stearate | 0.60 phr |
| Oxidized polyethylene | 0.15 phr |
| Dimethyltin mercaptide (ADVASTAB* TM-599T) | 0.25 phr | was processed as a Control on a dynamic two-roll mill at 187° C. (30F/40R) with chips being taken at one minute intervals. The formulation of this invention (Example 39), made by the addition of 0.05 phr of the product of Example 35 had a mild, yet decidedly pleasant odor during processing on the two-roll mill under the same conditions. The total color change (dE) and the Whiteness Index of each are shown in Table 21.

TABLE 21

| Example | 1 | 2 | 3 | 4 | 5 | 6 | 7 | 8 | 9 | 10 |
|---|---|---|---|---|---|---|---|---|---|---|
| | | | | dE at one minute intervals | | | | | | |
| Control | 4.6 | 6.3 | 7.0 | 7.5 | 8.1 | 9.4 | 10.7 | 12.1 | 14.4 | 16.8 |
| 39 | 3.9 | 4.6 | 4.8 | 5.1 | 5.7 | 6.7 | 8.5 | 10.8 | 13.7 | 16.5 |
| | | | | Whiteness Index at one minute intervals | | | | | | |
| Control | 61.2 | 49.8 | 45.6 | 43.0 | 39.1 | 31.9 | 24.9 | 17.1 | 6.8 | −6.5 |
| 39 | 63.6 | 58.0 | 57.3 | 54.5 | 50.5 | 45.1 | 35.5 | 24.1 | 8.8 | −5.2 |

EXAMPLE 40

The standard PVC pipe formulation of Examples 38–39 was again used as a Control and was processed on a dynamic two-roll mill at 187° C. (30F/40R) with chips being taken at one minute intervals. The formulation of this invention made by the addition of 0.03 phr of the product of Example 36 was processed under the same conditions. The total color change (dE) and the Whiteness Index of each are shown in Table 22.

TABLE 22

| Example | 1 | 2 | 3 | 4 | 5 | 6 | 7 | 8 | 9 | 10 |
|---|---|---|---|---|---|---|---|---|---|---|
| | | | | dE at one minute intervals | | | | | | |
| Control | 4.4 | 6.1 | 6.6 | 7.4 | 7.9 | 8.7 | 10.1 | 11.6 | 13.1 | 15.9 |
| 40 | 3.6 | 4.4 | 4.3 | 4.8 | 5.3 | 6.5 | 8.0 | 10.6 | 13.3 | 15.5 |
| | | | | Whiteness Index at one minute intervals | | | | | | |
| Control | 59.8 | 51.7 | 47.9 | 43.2 | 40.2 | 35.8 | 27.5 | 19.6 | 11.7 | −2.1 |
| 40 | 62.8 | 60.9 | 59.7 | 58.9 | 53.8 | 46.7 | 38.9 | 25.1 | 10.9 | −0.3 |

EXAMPLE 41 and Comparative Example 4

The standard PVC pipe formulation of Examples 38–39 was again used as a Control. The formulation of this invention made by the addition of 0.05 phr of the product of Example 37. For comparison, a formulation was made by the addition of 0.05 phr of nonylphenol to the Control. Each was processed on a dynamic two-roll mill at 187° C. (30F/40R) with chips being taken at one minute intervals. The total color change (dE) and the Whiteness Index of each are shown in Table 23.

TABLE 23

| Example | 1 | 2 | 3 | 4 | 5 | 6 | 7 | 8 | 9 | 10 |
|---|---|---|---|---|---|---|---|---|---|---|
| | | | | dE at one minute intervals | | | | | | |
| Control | 4.7 | 6.8 | 7.5 | 8.0 | 8.9 | 9.8 | 11.4 | 12.5 | 14.6 | 17.0 |
| 41 | 3.7 | 4.6 | 4.9 | 5.3 | 6.1 | 7.5 | 9.1 | 11.1 | 14.0 | 16.4 |
| Comp Ex 4 | 4.7 | 6.6 | 7.2 | 7.5 | 8.1 | 9.1 | 9.9 | 11.5 | 13.7 | 15.9 |
| | | | | Whiteness Index at one minute intervals | | | | | | |
| Control | 57.7 | 46.6 | 42.5 | 41.0 | 35.4 | 30.1 | 20.8 | 15.5 | 4.0 | −7.6 |
| 41 | 63.5 | 60.4 | 56.4 | 55.9 | 50.0 | 41.9 | 33.5 | 23.3 | 7.5 | −5.1 |
| Comp Ex 4 | 59.4 | 48.0 | 44.8 | 43.2 | 39.2 | 33.8 | 29.8 | 20.9 | 9.2 | −2.1 |

EXAMPLES 42–46

A standard flexible PVC formulation containing:

| INGREDIENT | AMOUNT |
|---|---|
| Geon 30 PVC resin | 100.00 |
| Dioctyl phthalate | 40.00 |
| Epoxidized soybean oil | 8.58 |
| Oxidized polyethylene | 0.20 |
| Stearic acid | 0.50 | was processed as the control on a standard two-roll mill at 199° C. with chips taken at two minute intervals. Then the same formulation except for the addition of the indicated amount of proctected mercaptan and N-substituted maleimides was also processed on the same two-roll mill under the same conditions. The total color change, dE, relative to a white tile standard, was measured using a Hunter calorimeter.

| EXAMPLE | INGREDIENT | AMOUNT |
|---|---|---|
| CONTROL | NONE | — |
| 42 | Mixture of Formulas 4–9 | 2.50 phr |
| 43 | N-ethylmaleimide | 2.50 phr |
| 44 | Mixture of Formulas 4–9 | 1.25 phr |
| | N-ethylmaleimide | 1.25 phr |
| 45 | N-phenylmaleimide | 2.50 phr |

-continued

| EXAMPLE | INGREDIENT | AMOUNT |
|---|---|---|
| 46 | Mixture of Formulas 4–9 | 1.25 phr |
| | N-phenylmaleimide | 1.25 phr |

TABLE 24

| | dE at two minute intervals | | | | | | | | | |
|---|---|---|---|---|---|---|---|---|---|---|
| Example | 2 | 4 | 6 | 8 | 10 | 12 | 14 | 16 | 18 | 20 |
| Control | 40.4 | 55.6 | 67.9 | 74.2 | 75.8 | 78.5 | — | — | — | — |
| 42 | 25.9 | 35.0 | 44.1 | 45.9 | 47.8 | 49.2 | 49.8 | 50.6 | 51.1 | 52.1 |
| 43 | 28.6 | 41.2 | 52.9 | 58.9 | 59.6 | 63.5 | — | — | — | — |
| 44 | 26.8 | 32.9 | 40.1 | 40.7 | 43.1 | 43.7 | 45.7 | 45.9 | 46.9 | 48.3 |
| 45 | 33.8 | 43.0 | 53.4 | 59.4 | 62.4 | 61.5 | — | — | — | — |
| 46 | 29.5 | 34.3 | 38.5 | 41.6 | 44.3 | 42.5 | 42.8 | 43.5 | 44.5 | 44.8 |

EXAMPLES 47–48 and Comparative Example 5

The stabilizing activities of 2-S-(tetrahydropyranyl)-thioethanol (Formula 4) and 2-S-(tetrahydropyranyl) thioethyl tallate, both prepared according to Procedure A hereinabove, and a thioether taught by Ludwig in U.S. Pat. No. 3,660,331 were compared by evaluating the color hold capacities of flexible PVC compositions containing the following base composition and a stabilizer as indicated in Table 25 on a dynamic two-roll mill at 350° F. (roll speed in rpm 30F/40R) on the yellowness index, as shown in Table 25.

| COMPONENT (TM or abbrev.) | PARTS BY WEIGHT |
|---|---|
| Polyvinyl chloride (GEON 30) | 100.0 |
| Dioctyl phthalate (DIDP) | 40.0 |
| Epoxidized soybean oil (ESO) | 5.0 |
| Stearic acid | 0.2 |
| Oxidized polyethylene | 0.2. |

| Ex. No. | Stabilizer | phr* |
|---|---|---|
| 47 | 2-S-(2-hydroxyethylthio)tetrahydropyran | 2.00 |
| | Zinc 2-ethylhexanoate (18%$_{wt}$ zinc) | 0.05 |
| 48 | 2-S-(dodecylthio)tetrahydropyran (Ludwig) | 2.00 |
| | Zinc 2-ethylhexanoate (18%$_{wt}$ zinc) | 0.05 |
| CE 5 | 2-S-(2-hydroxyethylthio)tetrahydropyran | 1.13** |
| | Zinc 2-ethylhexanoate (18%$_{wt}$ zinc) | 0.05 |

*Parts per hundred of PVC resin
**Sulfur content equal to Ex. 48 wash with water. The organic layer is dried with $MgSO_4$ to yield a light yellow liquid having an SH content of less than 0.5 percent as determined by titration with a 0.100 N iodine solution in isopropanol.

EXAMPLES 50–53 and Comparative Examples 6–9

The flexible PVC compositions in Table 26 contain the same base composition as in Examples 47 and 48 but without the oxidized polyethylene and with the indicated stabilizer.

| Ex. No. | Stabilizer | phr |
|---|---|---|
| 50 | 2-S-(2-hydroxyethylthio) tetrahydropyran | 1.13*** |
| 51 | 2-S-(2-hydroxyethylthio)tetrahydropyran | 2.00 |
| CE 6 | 2-S-(dodecylthio)tetrahydropyran (Ludwig) | 2.00 |
| 52 | 2-S-(tetrahydropyranyl)thioethyl tallate | 2.00 |
| | Zinc 2-ethylhexanoate (18% zinc) | 0.05 |
| CE 7 | 2-S-(dodecylthio)tetrahydropyran (Ludwig) | 2.00 |
| | Zinc 2-ethylhexanoate (18% zinc) | 0.05 |
| CE 8 | 2-S-(dodecylthio)tetrahydropyran (Ludwig) | 1.25† |
| | Zinc 2-ethylhexanoate (18% zinc) | 0.05 |
| 53 | 2-S-(tetrahydropyranyl)thioethyl tallate | 1.50 |
| | Conventional Ca/Zn stabilizer | 1.00 |
| CE 9 | 2-S-(dodecylthio)tetrahydropyran (Ludwig) | 0.94†† |
| | Conventional Ca/Zn stabilizer | 1.00 |

***Sulfur content equal to C.E. 6
†Sulfur content equal to Ex 52
Sulfur content equal to Ex 53

TABLE 25

| | Yellowness Index (YI) | | | | | | | | | | | |
|---|---|---|---|---|---|---|---|---|---|---|---|---|
| Time (Minutes) | 5 | 10 | 15 | 20 | 25 | 30 | 35 | 40 | 45 | 50 | 55 | 60 |
| 47 | 8.1 | 10.1 | 12.4 | 14.2 | 15.8 | 18.4 | 21.0 | 25.4 | 28.6 | 32.2 | 35.0 | 35.6 |
| 48 | 9.7 | 12.6 | 15.1 | 18.9 | 22.7 | 26.9 | 30.9 | 34.9 | 38.7 | 44.7 | 42.4 | 54.8 |
| CE 5 | 9.4 | 11.0 | 13.6 | 13.8 | 17.7 | 20.1 | 24.6 | 29.8 | 34.6 | 40.9 | 45.9 | 55.2 |

EXAMPLE 49

2-S-(tetrahydropyranyl)thioethyltallate is prepared by adding 44.6 grams (0.53 mole) of 3,4-dihydropyran to 183.7 grams (0.50 equivalent) of mercaptoethyltallate (9.0% SH) (made by the conventional esterification of mercaptoethanol with tall oil acid) over a period of 45 minutes in the presence of an acid catalyst while maintaining a nitrogen atmosphere and a temperature below 35° C. and then heating it to 50° C. and holding that temperature for 1.5 hours. After cooling the solution, it is washed with two 200 ml portions of a 10% sodium bicarbonate solution in water, followed by a 200 ml

TABLE 26

| Time (minutes) | 5 | 10 | 15 | 20 | 25 | 30 | 35 | 40 | 45 | 50 | 55 | 60 |
|---|---|---|---|---|---|---|---|---|---|---|---|---|
| 50 | 46.3 | 81.0 | 89.8 | 102.2 | 124.3 | 126.9 | 127.2 | 126.4 | 137.1 | 132.2 | 122.4 | 113.2 |
| 51 | 48.4 | 81.9 | 93.6 | 103.0 | 112.1 | 112.9 | 122.2 | 131.2 | 124.2 | 130.3 | 141.9 | 146.3 |
| CE6 | 56.4 | 99.7 | 117.5 | 124.3 | 137.4 | 138.2 | 150.1 | 152.8 | 153.7 | 159.9 | 160.6 | 164.6 |
| 52 | 11.1 | 12.3 | 13.3 | 14.9 | 15.5 | 17.3 | 18.0 | 24.3 | 32.9 | 40.2 | 51.6 | 67.6 |
| CE7 | 10.5 | 12.0 | 14.6 | 17.1 | 20.7 | 24.2 | 28.9 | 34.0 | 40.3 | 48.0 | 54.5 | 63.3 |
| CE8 | 9.9 | 11.4 | 13.2 | 17.1 | 22.5 | 27.1 | 36.7 | 42.7 | 51.5 | 58.9 | 72.1 | 85.0 |
| 53 | 11.2 | 12.7 | 14.7 | 16.8 | 18.5 | 20.5 | 23.6 | 28.9 | 37.0 | 54.9 | 106.2 | burn |
| CE9 | 10.8 | 12.4 | 14.9 | 17.4 | 19.1 | 21.0 | 26.4 | 36.4 | 46.3 | 67.1 | burn | — |

The dynamic thermal stability of the compositions of Examples 50 and 51 and Comparative Example 5, as measured on the BRABENDER PLASTICORDER test device at 200° C. and 80 rpm, is shown in Table 27.

TABLE 27

| | Dynamic Thermal Stability (minutes) |
|---|---|
| 50 | 51.7 |
| 51 | 57.6 |
| CE 6 | 57.3 |

EXAMPLE 54 and Comparative Example 10

An intermediate, 1-mercapto-2-hydroxypropyl isopropyl ether, was made by the reaction of H$_2$S with isopropyl glycidyl ether in the presence of triethylamine. The intermediate was then reacted with 3,4-dihydropyran according to Procedure A to make a latent mercaptan of this invention having the formula

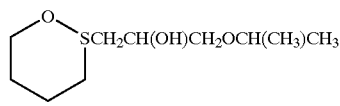

Formula 28 wherein a is 1, m and n are 0, X is oxygen, R$^3$ and R$^7$ join with X to form a heterocyclic moiety, and R$^1$ is alkoxy-hydroxyalkyl as it relates to Formula 1. The stabilizing activity of the product, 2-S-(tetrahydropyranyl)-1-isopropoxy-3-thio-2-propanol, was then compared with, that of the 2-S-(dodecylthio)tetrahydropyran of Ludwig in PVC rigid pipe-making compositions at equal sulfur content levels and at equal stabilizer use levels. The Whiteness Index of the compositions during processing on a two-roll mill, at 390° C. was measured at one-minute intervals. The stabilizer compositions given below were added to the basic composition as shown in Table 28. The basic composition had the formulation:

| COMPONENT | PARTS BY WEIGHT |
|---|---|
| Polyvinyl chloride (k = 65) | 100.0 |
| Calcium carbonate | 5.00 |
| Titanium dioxide | 1.00 |
| Paraffin wax | 1.20 |
| Calcium stearate | 0.60 |
| Oxidized polyethylene | 0.15. |

| Ex. No. | Stabilizer Compositions | phr |
|---|---|---|
| CE 10 | 2-S-(dodecylthio)tetrahydropyran | 0.18 |
| | Tin mercaptide (ADVASTAB TM-599T) | 0.20 |
| 54 | 2-S-(tetrahydropyranyl)1-isopropoxy--3-thio-2-propanol | 0.15* |
| | Tin mercaptide (ADVASTAB TM-599T) | 0.20 |
| 55 | 2-S-(tetrahydropyranyl)1-isopropoxy--3-thio-2-propanol | 0.18* |
| | Tin mercaptide (ADVASTAB TM-599T) | 0.20 |

▲Sulfur content equal to CE 10
▲Use level equal to that of CE 10

TABLE 28

PVC Color Hold (Whiteness Index) During Processing by Two-Roll Mill @ 390° F.

| (minutes) | 1 | 2 | 3 | 4 | 5 | 6 | 7 | 8 | 9 | 10 | 11 | 12 |
|---|---|---|---|---|---|---|---|---|---|---|---|---|
| CE10 | 47.5 | 29.4 | 25.3 | 24.5 | 23.1 | 22.2 | 18.0 | 17.3 | 11.5 | 6.4 | 1.5 | −2.6 |
| 54 | 46.0 | 40.4 | 36.4 | 37.2 | 35.6 | 33.5 | 32.3 | 26.9 | 19.2 | 10.2 | 14.8 | −4.4 |
| 55 | 44.8 | 38.8 | 35.9 | 37.4 | 33.7 | 31.3 | 28.6 | 18.2 | 17.0 | 9.0 | 5.2 | 2.0 |

EXAMPLE 56 and Comparative Example 11

The whiteness index of rigid pipe-making PVC compositions having the above basic formulation and containing the following stabilizer formulations, measured as described above, is shown in Table 29.

| Ex. No. | Stabilizer Compositions | phr |
|---|---|---|
| CE 11 | 2-S-(dodecylthio)tetrahydropyran | 2.00 |
|  | Zinc octoate (18% zinc) | 0.10 |
| 56 | 2-S-(tetrahydropyranyl)1-isopropoxy--3-thio-2-propanol | 2.00 |
|  | Zinc octoate (18% zinc) | 0.10 |

TABLE 29

| PVC Color Hold (Whiteness Index) During Processing by Two-Roll Mill @ 390° F. | | | | | | | | | | | | |
|---|---|---|---|---|---|---|---|---|---|---|---|---|
| minutes | 1 | 2 | 3 | 4 | 5 | 6 | 7 | 8 | 9 | 10 | 11 | 12 |
| A | 32.7 | 1.1 | −9.7 | −8.6 | −1.7 | 5.6 | 12.0 | 18.8 | 24.7 | 26.7 | 28.2 | 32.7 |
| B | 51.0 | 42.1 | 37.9 | 37.8 | 35.2 | 35.6 | 33.2 | 28.0 | 19.9 | 11.8 | 4.3 | 0.6 |

EXAMPLE 57

An intermediate, 1-mercapto-2-hydroxypropyl neodecanoate, was made by the addition of H₂S to glycidyl neodecanoate in the presence of triethylamine. An exothermic reaction between 20 parts by weight (0.049 mole) of the product and 4.29 parts by weight (0.051 mole) of 3,4-dihydropyran in the presence of methane sulfonic acid raised the temperature of the mixture to 60° C. before it was cooled rapidly to 40° C. and held there for 5 hours. The product was taken up in ethyl acetate, washed with aqueous sodium bicarbonate solution, water and brine, then dried with magnesium sulfate and stripped to yield 20.9 parts of 2-S-(tetrahydropyranyl)3-thio-2-hydroxypropyl neodecanoate containing only 0.28% SH. The R¹ radical of this latent mercaptan is neodecanoyloxy-hydroxypropyl.

EXAMPLE 58

Five hundred mls of heptane and 168 grams (1.12 moles) of the 1-mercapto-2-hydroxypropyl isopropyl ether of Example 54 were charged to a one-liter round bottom flask equipped with a condenser and Dean-Stark collector. Then 144.9 grams (1.75 moles) of propionic acid and 1.7 grams of methane sulfonic acid were added. Twenty mls of water were collected as the reaction mixture was heated at the 95° C. reflux temperature. The product was chilled in an ice bath before excess acid was washed out with aqueous sodium bicarbonate and brine. The product was dried with magnesium sulfate and stripped to yield 217 grams of the isopropyl ether of 1-mercapto-2-propionoyloxypropane having a 13.89% SH content compared to the theoretical value of 16.03%.

Ten grams (0.048 mole) of the ester and 3 drops of methane sulfonic acid were charged to a 100 ml round bottom flask equipped with a magnetic stirrer bar and an exothermic reaction raised the temperature to 60° C. when 4.28 grams (0.051 mole) of 3,4-dihydropyran was added. The mixture was cooled and the reaction was continued at 40° C. for about 19 hours. The product had an SH level of 0.43%. The 2-S-(tetrahydropyranyl)-1-isopropoxy-3-thio-2-propionoyloxypropane has the formula

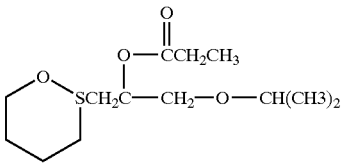

Formula 29 wherein a is 1, m and n are 0, z is 1, X is oxygen, R³ and R⁷ join with X to form a heterocyclic moiety, and R¹ is isopropoxy-propionoyloxypropyl.

EXAMPLE 59

The adduct of 3,4-dihydropyran (DHP) and lauryl-3-mercaptopropionate was made by adding 8.6 grams (0.0102 mole) of the DHP over a 20 minute period to 29.0 grams (0.1 mole) of the ester and 0.1 gram of methane sulfonic acid in an ice-cooled reactor; the exotherm warmed the mixture to room temperature and heat was applied to continue the eaction at 40–45° C. for 4 hours. The SH content of the product was only 0.44% by weight. The formula for the product is

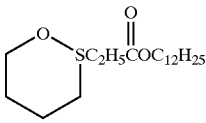

Formula 30 wherein a is 1, m and n are 0, z is 1, X is oxygen, R³ and R⁷ join with X to form a heterocyclic moiety, and R¹ is dodecyloxycarbonylethyl.

EXAMPLE 60

Bis[2-S-(tetrahydropyranyl)thioethyl malonate]was prepared by charging 30 grams (0.18 mole) of bis-(2-mercaptoethyl malonate) and 0.08 gram of methane sulfonic acid into a nitrogen-purged round bottom flask and adding 21.87 grams (0.26 mole) of DHP over a 15 minute period. The exotherm raised the temperature to 50° C. and the mixture was held at that temperature for 30 minutes. Gas chromatography showed that about 90% of the product was the desired latent mercaptan. Residual startimg materials were stripped off by heating the mixture to 40° C. at 35 mm Hg. Filtration gave a 79% yield of clear, low-odor product having an SH content of less than 0.05%. The generic R¹ radical is alkylene bis-(carbonyloxyalkyl).

EXAMPLE 61

A latent mercaptan of this invention having a dihydroxypropyl radical as the R¹ radical of Formula 1 was prepared by stirring 108.2 grams (1.0 mole) of 3-mercapto-1,2-propanediol and 0.49 gram of methane sulfonic acid in an ice-water cooled round bottom flask while adding 85.8 grams (1.02 moles) of DHP dropwise. The mixture was allowed to warm to room temperature for 15 minutes and then was heated to 40° C. for 4 hours. The SH content of the product was less than 1%. The formula of the product, 2-S-(tetrahydropyranyl)3-thio-1,2 propanediol, is

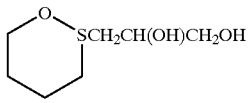

Formula 31 wherein a is 1, m is 0, n is 1, z is 1, X is oxygen, $R^3$ and $R^7$ join with X to form a heterocyclic moiety, and $R^1$ is dihydroxypropyl.

EXAMPLE 62

A latent mercaptan of this invention having a carboxyalkyl radical as the $R^1$ of Formula 1 was prepared by cooling 69.44 grams (0.75 mole) of thioglycolic acid and 0.33 gram of methane sulfonic acid in a round bottom flask and adding 64.3 grams (0.765 mole) of DHP dropwise. The mixture was heated to 40° C. for 6 hours. The SH content was 0.06%. The formula for the 2-S-(tetrahydropyranyl)thioglycolic acid is

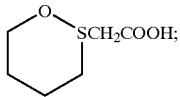

Formula 32 wherein a is 1, m and n are 0, z is 1, X is oxygen, $R^3$ and $R^7$ join with X to form a heterocyclic moiety, and $R^1$ is carboxymethyl.

EXAMPLE 63

An intermediate, 2-ethylhexyl mercapto-hydroxypropyl ether, was made by the reaction of $H_2S$ with 2-ethylhexyl glycidyl ether in the presence of triethylamine. The intermediate was then reacted with 3,4-dihydropyran according to Procedure A to make a latent mercaptan of this invention having the formula Formula 33

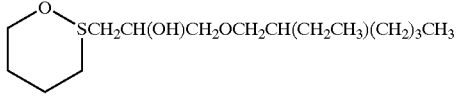

wherein a is 1, m and n are 0, X is oxygen, $R^5$ and $R^7$ join with X to form a heterocyclic moiety, and $R^1$ is ethylhexoxyhydroxypropyl as it relates to Formula 1. The SH content was 0.26% by weight.

EXAMPLE 64

An intermediate, 1-mercapto-2-hydroxypropyl butyrate, was made by the reaction of $H_2S$ with 10 grams of glycidyl butyrate wherein an exotherm raised the temperature from 15 to 47° C. in the presence of 50 mls methanol and 9.7 mls triethylamine. The methanol and amine were stripped off and the residue extracted with ethyl acetate. The extract was washed with 0.1N HCl and brine, dried with magnesium sulfate and stripped to yield 9.7 grams of the inermediate. Five grams of the intermediate was then reacted exothermally with 1.81 grams of 3,4-dihydropyran with cooling according to Procedure A to make a latent mercaptan of this invention having the formula

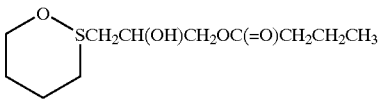

Formula 34 wherein a is 1, m and n are 0, X is oxygen, $R^5$ and $R^7$ join with X to form a heterocyclic moiety, and $R^1$ is butanoylhydroxypropyl as it relates to Formula 1. The SH content was 0.33% by weight.

EXAMPLE 65

A chelating agent is made in an acid catalyzed reaction of 411.3 grams (2 equivalents) of pyridoxine (3-hydroxy4,5-dimethylol-2-methylpyridine) with 78 grams (1 equivalent) of mercaptoethanol 138 grams (1 equivalent) of mercaptoethyleter ($HSCH_2CH_2OCH_2SH$) to give a compound having Formula 35 below:

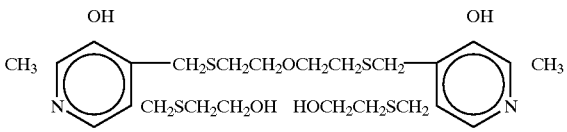

wherein, with reference to Formula 1, a is 2, m is 1, n is 0, y is 2, X is pyridinyl, $R^1$ is ethoxyethyl, $R^6$ is hydroxyl, one of the $R^7$ radicals on each ring is methyl, and the other is hydroxyethylmercaptomethyl.

EXAMPLE 66

An equimolar mixture of thioglycolic acid (124 grams) and diethyleneglycol (106 grams) And a catalytic amount of methanesulfonic acid is heated to 100° C. at a pressure of 400 Torr and then heated further to 120° C. as the pressure is reduced to 10 Torr over a period of 2 hours to reduce the acid number to less than 10. The product is washed and dried. The mono-ester is the predominant product. The mixture of reaction products is then reacted with an excess of 3,4-dihyropyran to obtain an adduct having an —SH content less than 0.1% by weight. $R^1$ of Formula 1 for the principal product is hydroxy(polyethoxy)carbonylmethyl. A bright white pipe is obtained from the extrusion of a rigid PVC pipe formulation containing this product as a heat stabilizer.

EXAMPLE 67

A product having a structure and properties similar to those of the product of Example 66 is obtained when the same procedure is followed with the exception of using triethyleneglycol in place of diethyleneglycol. In this case, $R^1$ of Formula 1 for the principal product is a hydroxy (polyalkoxy)carbonylalkyl radical wherein the polyalkoxy chain has three units.

The acyloxy and benzoyloxy derivatives of the hydroxy (polyalkoxy)carbonylalkyl moiety are made by the conventional esterification methods wherein the appropriate carboxylic acid is reacted with the hydroxyl group. The tetrahydropyranyloxy(polyalkoxy)carbonylalkyl is made by a procedure similar to Procedure A hereinabove except for the use of the glycol derivative instead of a mercaptan. The etherification of the hydroxy(polyalkoxy) moiety with an alcohol such as propanol, benzyl alcohol, or butanol is accomplished by heating a mixture of the glycol derivative, the alcohol, and an acid catalyst to drive off water of condensation.

EXAMPLE 68

The adduct of 3,4-dihydropyran and the methyl ester of N-acetyl cysteine is made by adding 8.83 gram (0.105 mole) of the DHP dropwise to 18 grams (0.102 mole) of the ester amd 0.1 gram of methanesulfonic acid in an ice-cooled reactor. The mixture is then warmed to 40–50° C. and held there for 4 hours. The product is the methyl ester of 2-tetrahydropyranyl-N-acetyl cysteine. The $R^1$ radical in Formula 1 is methoxycarbonyl(N-acetoamido)alkyl Articles of manufacture contemplated by this invention, e.g. pipe, film, and window profile, are formed from the stabilized compositions of this invention by any of the well-known conventional techniques for forming polymers into shaped articles.

While a few specific embodiments of this invention have been disclosed in considerable detail, variations and modifications of these embodiments can be effected without departing from the spirit and scope of the invention as disclosed and claimed herein.

What is claimed is:

1. A composition for stabilizing PVC consisting essentially of a metal salt stabilizer selected from the group consisting of barium, strontium, calcium, tin, and antimony salts, or an organometallic stabilizer for PVC and a latent mercaptan having the formula

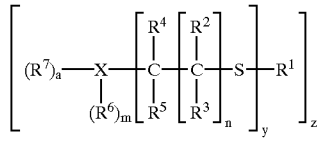

wherein a is 0 or 1, m and n are 0 or 1; y=1 to 4, when y=1, z is 1 to 4 when y is more than 1 z is 1; $R^1$ is a hydroxyalkyl, dihydroxyalkyl, hydroxy(polyalkoxy)alkyl, alkoxyalkyl, hydroxyalkoxyalkyl, alkoxy(hydroxyalkyl), alkoxy(polyalkoxy)alkyl, or alkoxycarbonyl(amido)alkyl radical having from 1 to 22 carbon atoms; $R^2$, $R^3$, $R^4$, $R^5$, $R^6$, and $R^7$ are independently hydrogen, a hydroxyl, mercapto, alkyl, akylenyl, aryl, haloaryl, alkaryl, aralkyl, hydroxyalkyl, mercaptoalkyl, hydroxyaryl, alkoxyaryl, alkoxyhydroxyaryl, or arylcarbonyl radical having from 1 to 22 carbon atoms; X is aryl, haloaryl, alkaryl, hydroxyaryl, dihydroxyaryl, aralkaryl, alkoxyaryl, arylcycloalkyl, or a heteroatom; when a is 1 and m is 0, one of the $R^3$ and $R^5$ groups joins with $R^7$ and X to form a heterocyclic moiety with X as a heteroatom selected from the group consisting of oxygen and sulfur, and when m is 1, $R^6$ and $R^7$ form a heterocyclic moiety in conjunction with X as a nitrogen atom; with the proviso that when X is aralkaryl, $R^6$ and $R^7$ are hydroxyl, z is 1 or 2, a is 1, and m is 1; and with the further proviso that when $R^6 \neq$ hydroxyl, z is 1.

2. The composition of claim 1 further characterized by the presence of a biocide.

3. The composition of claim 2 wherein the biocide is 10, 10'-oxybisphenoxarsine.

4. The composition of claim 1 wherein $R^1$ is hydroxyalkyl.

5. The composition of claim 1 wherein X is oxygen, a is 1 and m is 0, $R^5$ and $R^7$ form a heterocyclic moiety in conjunction with X, and n is 1.

6. The composition of claim 5 wherein $R^1$ is hydroxyalkyl.

7. The composition of claim 1 wherein wherein a is 1, m and n are 0, X is oxygen, $R^3$ and $R^7$ join with X to form a heterocyclic moiety, and $R^1$ is alkoxy-hydroxyalkyl.

8. The composition of claim 7 wherein $R^1$ is isopropoxy-hydroxyethyl.

* * * * *